US011669468B2

(12) United States Patent
Kamath et al.

(10) Patent No.: US 11,669,468 B2
(45) Date of Patent: Jun. 6, 2023

(54) INTERCONNECT MODULE FOR SMART I/O

(71) Applicant: HEWLETT PACKARD ENTERPRISE DEVELOPMENT LP, Houston, TX (US)

(72) Inventors: Harish Bantwal Kamath, Bengalooru (IN); Michael Lee Witkowski, Tomball, TX (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 167 days.

(21) Appl. No.: 16/860,038

(22) Filed: Apr. 27, 2020

(65) Prior Publication Data
US 2020/0409873 A1 Dec. 31, 2020

(30) Foreign Application Priority Data
Jun. 28, 2019 (IN) .............................. 201941025975

(51) Int. Cl.
*G06F 13/12* (2006.01)
*G06F 13/38* (2006.01)
(Continued)

(52) U.S. Cl.
CPC .......... *G06F 13/128* (2013.01); *G06F 9/4411* (2013.01); *G06F 13/36* (2013.01); *G06F 13/385* (2013.01); *H04L 47/125* (2013.01)

(58) Field of Classification Search
CPC ...... G06F 13/128; G06F 9/4411; G06F 13/36; G06F 13/385; H04L 47/125
See application file for complete search history.

(56) References Cited

U.S. PATENT DOCUMENTS 5,878,231 A * 3/1999 Baehr ................. H04L 63/0236
709/245
9,674,090 B2 6/2017 Caulfield et al.
(Continued)

OTHER PUBLICATIONS

Ash Bhalgat, "Best SmartNIC for Building the Smart Cloud: Part II", Mellanox Technologies, available online at <https://blog.mellanox.com/2018/10/building-the-smartnic-for-the-cloud-with-the-perfect-networking-asic/>, Oct. 17, 2018, 5 pages.
(Continued)

*Primary Examiner* — John A Follansbee
*Assistant Examiner* — Fadi Haj Said
(74) *Attorney, Agent, or Firm* — Mauriel Kapouytian Woods LLP

(57) ABSTRACT

An interconnect module (ICM) having at least two internal data paths is provided. The ICM determines if a connected network interface card (NIC) supports a division of work between the NIC and the ICM. NICs may be standard NICs, advanced NICs (ANICs), or smart NICs (SNICs). The ICM may perform a different amount of processing for network packets received from different devices based on the division of work previously identified. Some NICs may preprocess network packets with respect to switching and routing processing to allow the ICM to bypass that functionality for those packets. Packets received from devices not providing a division of work receive full processing including switching and routing processing. Devices may be grouped to either a switching and routing group or a virtual bypass group such that data received from devices associated with the virtual bypass group may bypass selected processing typically performed by the ICM.

20 Claims, 12 Drawing Sheets

(51) Int. Cl.
     *H04L 47/125*     (2022.01)
     *G06F 9/4401*     (2018.01)
     *G06F 13/36*      (2006.01)

(56)           References Cited

U.S. PATENT DOCUMENTS

| | | |
|---|---|---|
| 2004/0172485 A1 | 9/2004 | Naghshineh et al. |
| 2008/0151893 A1 | 6/2008 | Nordmark et al. |
| 2013/0286846 A1* | 10/2013 | Atlas ............... H04L 47/726 370/235 |
| 2016/0182398 A1 | 6/2016 | Davis et al. |
| 2019/0334862 A1* | 10/2019 | Paul ............... G06F 9/45558 |
| 2020/0278892 A1* | 9/2020 | Nainar ............... H04L 67/10 |

OTHER PUBLICATIONS

Netronome, "Hardware Acceleration for Network Services", Netronome Systems, Inc., White Paper, 2017, pp. 1-6.

\* cited by examiner

INTERCONNECT MODULE FOR SMART I/O

BACKGROUND

Information Technology departments in corporations have started building their computer infrastructure to be completely software defined. This software-defined infrastructure, sometimes referred to as hyperconverged infrastructure (HCI), virtualizes the computing, storage, and networking of a computer so that allocation of computing resources can be extremely flexible. HCI allows corporations to instantly build a virtualized computer by completely defining the computer's capability specification in software. Each virtualized computer defined by software utilizes a portion of a physical computer. The result is that physical computing, storage, and network capacity is more efficiently utilized. One application of software defined infrastructure is to execute one or more "Virtual Machines" (VMs) on a single physical machine. Each VM has the capability of a computer that would be executing on a physical server. The VM, running in parallel with other VMs on a physical machine, is constrained by the capabilities of the single machine in which the VMs are running.

Virtual machines may be executed on physical computer servers that are running a software package known commonly as a hypervisor. The hypervisor provides the management of the execution of the virtual machines as well as mediates access from the virtual machines to physical resources such as memory, disk, and networking. In the case of networking, the hypervisor hosts a software-based logical switch/router for managing traffic between virtual machines and the physical Network Interface Controller (NIC) that connects the physical machine to the enterprise network. The logical switch/router behaves much like a general switch/router used to support networking infrastructure but is implemented as a component of the hypervisor. A basic NIC can support converged network traffic where the network traffic is merged and unmerged to support concurrent execution on multiple virtual machines. The basic NIC, however, does not participate in the switching/routing of network data.

BRIEF DESCRIPTION OF THE DRAWINGS

The present disclosure may be better understood from the following detailed description when read with the accompanying Figures. It is emphasized that, in accordance with standard practice in the industry, various features are not drawn to scale. In fact, the dimensions or locations of functional attributes may be relocated or combined based on design, security, performance, or other factors known in the art of computer systems. Further, order of processing may be altered for some functions, both internally and with respect to each other. That is, some functions may not require serial processing and therefore may be performed in an order different than shown or possibly in parallel with each other. For a detailed description of various examples, reference will now be made to the accompanying drawings, in which.

DETAILED DESCRIPTION

Figure 1:
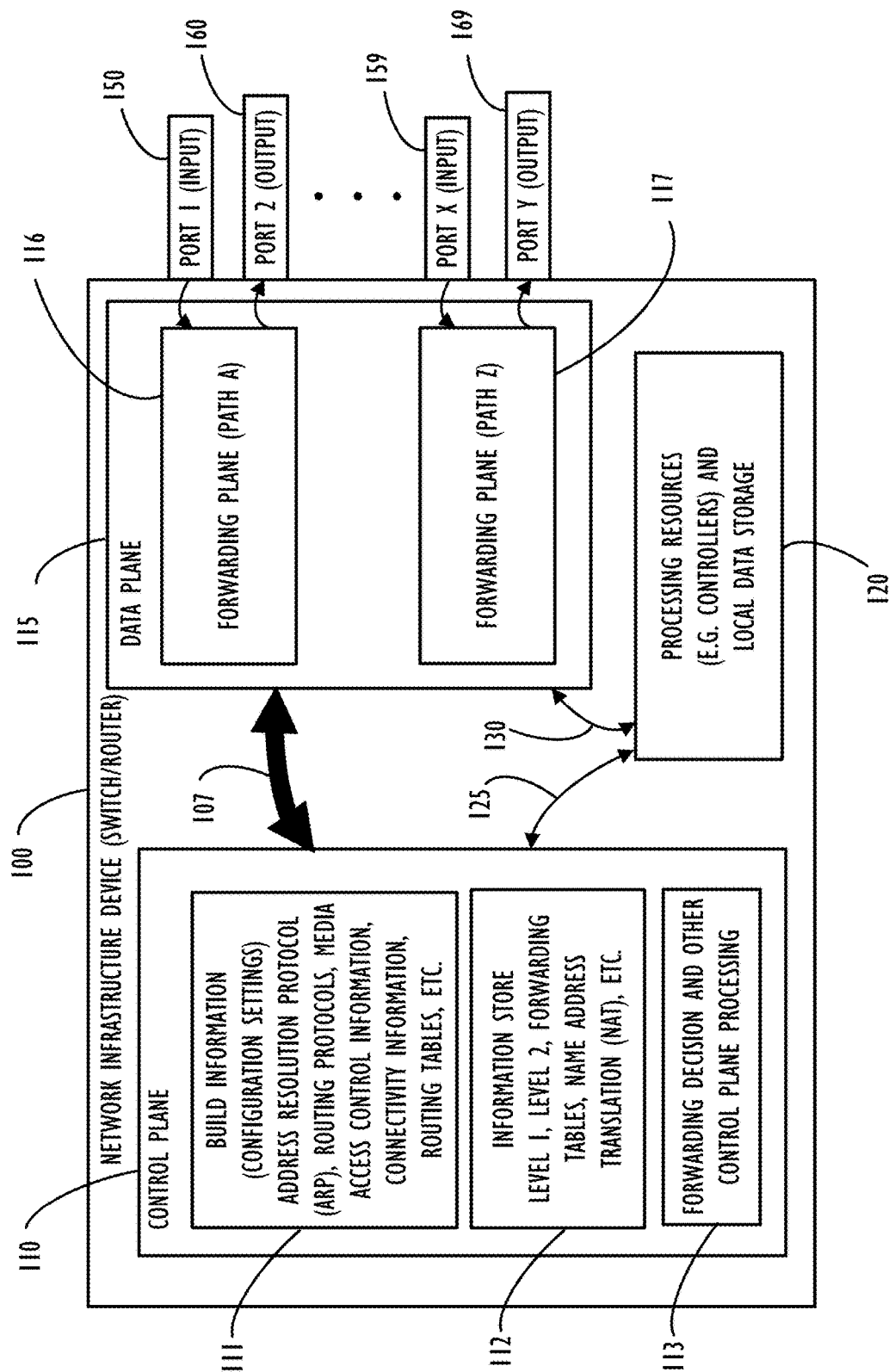
FIG. 1 illustrates a functional block diagram of a network infrastructure device such as switch/router, according to one or more disclosed implementations.

Illustrative examples of the subject matter claimed below will now be disclosed. In the interest of clarity, not all features of an actual implementation are described for every example implementation in this specification. It will be appreciated that in the development of any such actual example, numerous implementation-specific decisions may be made to achieve the developer's specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Data centers designed to host servers implementing HCI may not be significantly different in design from data centers consisting of only physical machines performing computation workloads. In all designs, physical machines are connected via networking infrastructure devices such as switches or routers. In an HCI infrastructure, switches connecting to servers hosting multiple machines may be referred to as Edge Switches or Interconnect Modules which are commonly referenced with the abbreviation "ICM." Each of these network infrastructure devices may perform some level of network traffic handling to ensure that network traffic is delivered to the correct destination physical or VM.

Computers in a data center may be utilized to execute multiple VMs and may be connected to an ICM via a standard NIC. This connection may be an Ethernet link between the ICM and the NIC. The NIC may be installed in the computer via the Peripheral Component Interconnect Express (PCIe) bus slot on the computer motherboard or may be communicatively coupled to the computer in some other manner. In general, network data that is to be delivered to a VM running on a particular host would a) be routed through the network switching/routing services on the ICM, b) converged to flow through the NIC on the physical machine hosting the destination VM, and c) then routed again through a logical layer of switching/routing services implemented in software by the hypervisor that is managing the VM on the physical server.

Repeatedly performing actions, a, b, and c, for each network packet may represent a computationally costly path. This process may be costly for several reasons. Specifically, not only are there two layers of network routing the network data must traverse, the computational cycles to route the data in the logical routing/switching services provided by the hypervisor are typically shared with the computational cycles needed by the VMs to execute their computational load. During periods of high network traffic, VMs running on a host may experience performance degradation as the hypervisor attempts to share the finite computation capacity between handling network demands and the demands of each VM for a share of the computation capacity of the physical server. That is, network processing overhead may have an impact on the amount of CPU available to process VMs or applications executing within VMs.

As explained further below, applications on a host do not typically directly interact with the capabilities of the PCIe Physical Functions (PF) or Virtual Functions (VF) resources. A PF device is typically exposed via a NIC driver and a VF is presented via a Hypervisor component as a NIC. Single-root input/output virtualization (SR-IOV) is an example of a resource that is exposed within a VM due to the VF. In this example, the SR-IOV driver in the guest operating system (OS) of a VM instance interacts with an emulated NIC (e.g., a VF device) of the Hypervisor.

As explained throughout this disclosure NICs may be implemented based on at least three categories of functionality. That is, different types of NICs may have different amounts of computational hardware and associated programming (in hardware logic, firmware, or software). This disclosure will address different levels of capability using three segregations; however, further segregation may also be possible.

The first classification of a NIC is referred to as a basic NIC (or simply NIC) and represents a hardware device that substantially performs no advanced network switching/routing functionality. Thus, a basic NIC relies on other infrastructure hardware to perform these advanced functions.

The second classification is referred to as an advanced NIC (or simply ANIC). An ANIC may include additional functionality (that is often implemented in firmware) and provide a first level of offload capability for other infrastructure devices. That is, the ANIC will locally process network protocols in lieu of relying on another component of infrastructure hardware, if the ANIC has been enhanced to provide that specific capability.

The third classification is referred to as a Smart NIC (or simply SNIC) and coordination of offloading between an ICM and an SNIC is provided as different examples of this disclosure. In general, an SNIC is more powerful and flexible than either a NIC or an ANIC and utilize an integrated processing capability (e.g., that may include software) to provide a flexible and configurable amount of offloaded processing. Thus, an SNIC may provide improved computer functionality and performance over either a NIC or an ANIC.

Disclosed implementations also provide an ICM that may support a hybrid of attached NICs (e.g., a combination of NIC, ANIC, and SNIC interfaces) seamlessly and concurrently to leverage each adapters capability and configuration. In some cases, a configuration over-ride may be used to determine that an SNIC (or ANIC) may function at a configuration level below their full capability (e.g., hardware and/or software capability). Specifically, an ICM connected to three instances of SNICs may treat one of those instances as if it were a NIC (or ANIC) while concurrently treating the other two instances as fully functional SNICs. For some protocols (e.g., storage protocols) it may be desirable to utilize this over-ride or a different over-ride to limit capability offloaded from an ICM to an SNIC.

One of the several benefits of this disclosure may be realize by implementations that use one or more Smart NIC (SNIC) adapters. Each of the SNIC adapters may be configured to deliver network specific functions (including both control and data plane operations of switch/routing), as well as network traffic isolation and security functions (encryption, key management, access control, etc.). These SNIC adapters may also embed multiple computer central processing units (CPU) to form an environment somewhat similar to a general-purpose computer as part of the SNIC. By implementing partial or full functionality of a typical switch/router used as a network infrastructure device, SNICs may have the ability to more completely offload the virtual switching functions from the hypervisor (possibly take those functions completely). This offloading may then enable more CPU cycles for workloads in the compute nodes (e.g., VM overhead or application processing within a VM). That is to say, the logical switching/routing services typically provided by the hypervisor may now be implemented, at least in part, by the CPU included on the SNIC rather than the CPU used by the hypervisor to execute the VM. Note there may be more than one CPU on a given devices and reference here to CPU in the singular is for convenience only.

Attempts have been made to offload portions of this routing/switching by creating Advanced NICs (ANIC). The use of ANICs provided some level of simple offloading of the logical switching/routing services from the hypervisor by using the capabilities of the PCIe Physical Functions (PF) to register Virtual Functions (VF). This use of ANICs may allow software running in the VM to connect directly to the ANIC rather than having the hypervisor mediate connectivity between the VM and the NIC over the PCIe interface. Implementations using ANICs, however, may be restricted to the purpose of performing simple network data I/O to the ICM. In particular, in an ANIC implementation an ICM may still be relied upon to implement the more complicated tasks involved in switching/routing. These more complicated tasks are often associated with efficiently moving network data through the network. Some of these tasks may involve the use of protocols such as Border Gateway Protocol (BGP), Spanning Tree Protocol (STP), Unidirectional Link Detection (UDLD), and other protocols typically used to configure and maintain a network infrastructure.

In contrast to implementations using ANICs, an SNIC that is capable of performing network switching/routing capabilities may be connected to an ICM and result in the switching/routing capability of the ICM becoming redundant. That is, the functionality previously provided by an ICM connected to an ANIC may be redundant to capabilities that may be provided through the use of an SNIC as described in this disclosure. In some disclosed implementations, an SNIC may be used to both a) offload the switching/routing capability of the hypervisor for the VM, and b) offload the switching/routing capability of the ICM. In general, an SNIC, configure in accordance with some implementations of this disclosure, may be connected to an ICM that is aware of the capability of the SNIC. Thus, processing (e.g., the switching/routing capability that was previously provided by the ICM) provided by the ICM/ANIC combination may be provided exclusively by the SNIC. Specifically, one benefit of implementations of this disclosure is that pre-processing egress traffic by the SNIC may occur before transmitting that traffic to the ICM. This traffic is on a path through the SNIC to the ICM and then sent onto the enterprise network. Thus, the enhanced pre-processing of the SNIC as described herein may enable the ability to scale out switching/routing performance and allow lower latency through the ICM. The improvement in performance and latency may be achieved due to the simplified packet processing functionality involved in the ICM. Simply put, the SNIC, as disclosed herein, may perform functions historically performed within an ICM and thus reduce load on the ICM.

As discussed above, in some disclosed implementations, the ICM may be able to offload the switching/routing to the SNIC by using techniques of this disclosure. One method of offloading may include an implementation where the ICM may be configured to expect SNIC devices to be connected to specific ICM ports. In another example, the SNIC and ICM may communicate to exchange capabilities that would allow the ICM to offload the capabilities to the SNIC. The ICM, having identified an SNIC with the capability to offload switching/routing connected to a port, may classify the SNIC in a "Virtual Passthrough Group". As a result of this classification, the ICM may then send network traffic directly to the SNIC for switching/routing, bypassing any switching/routing capabilities internal to the ICM. Thus, ICM and SNIC combinations configured in accordance with this disclosure may represent an improvement to the functioning of a computer system (e.g., reduction of processing and associated load on an ICM).

Further, in some implementations not all NIC interfaces may have SNIC capability and network traffic between ports in the Virtual Passthrough Group may be routed directly between the network and SNIC connected to the ICM, while other connections to the ICM that are not SNICs are not provided a virtual passthrough capability. Simply put, a first classification of connections implemented with a basic NIC (standard NIC) or an ANIC may still be dependent on the ICM's switching/routing capability. As explained herein, a second connection classification may be further provided to allow for a hybrid environment where a mixture of NICs (e.g., NICs having different levels of capability) may be used simultaneously. This second connection classification may be provided by having a second group of connections classified as the "Switching and Routing Group" by the ICM. While the assignment of a group to a connection may be performed automatically (e.g., by the ICM discovering NIC types), in some implementations this assignment of group may be overridden by an administrator (e.g., configuration of the ICM, SNIC, or both). In a situation where an SNIC connection has been overridden to be in the switching and routing group, the ICM may then provide the switching/routing capability, and the SNIC may bypass internal redundant processing that it would have been capable of performing if not for the system administration override.

Having the above classifications of connections may allow an ICM to automatically determine that traffic arriving to the ICM from connections which are members of the Switching and Routing Group are to be directed to go through the switching and routing rules as configured by the ICM administrator. In contrast, the same ICM may determine that traffic arriving to the ICM from connections that are members of the Virtual Passthrough Group may be sent directly from the SNIC on ingress and directly to one or more associated ports on egress. Grouping may be implemented by using container technology, tagging, or another mechanism.

Still further, SNICs attached to ports of the ICM may be of different capabilities and configurable to perform one or more functions. An SNIC capable of performing switching/routing functions, for example, may have different sets of features available for use when performing the switching/routing functions. SNICs may also perform functions unrelated to switching/routing. For example, some SNICs may provide interfacing to storage using network protocols such as Internet small computer systems interface (iSCSI), Fibre Chanel over Ethernet (FCoE), or others. In some implementations, overall capabilities of each individual SNIC may be published to the ICM or other management entities within a network infrastructure (e.g., network management tools). Alternatively to publishing, a management appliance administrator may query the SNIC for its capabilities and apply one or more functions to be acted upon in an order of precedence or priority. In general, the SNIC may advertise its capabilities to allow for more efficient interaction with a system administrator or network administration tools.

Support for storage interfaces represents a capability available for SNICs that may not be available for ANICs or basic NICs. In one example, a host may be utilizing two networked services including a first for storage messaging and a second for Ethernet related messaging. Accordingly, an SNIC may expose two offloaded functions: a) a first to support FCoE (or non-volatile memory express "NVMe"); and b) a second to support switching only (no routing) services. These two offloaded functions may be presented as two different PFs of PCIe. In this scenario, Ethernet traffic of the SNIC can leverage (e.g., utilize) the switching and routing services of the ICM to obtain routing support. The FCoE traffic would, in this example, be associated with the Virtual Passthrough Group of the ICM while the Ethernet traffic would be routed via the Switching and Routing Group of the ICM. Of course, different configurations and scenarios are possible. In short, an SNIC may provide for many combinations and permutations of coordinated offloaded capability with an ICM as negotiated between the two devices and based on configuration attribute settings set by a system administrator.

In some implementations, an SNIC may have a dynamic capability to provide certain types of switching/routing capabilities. The SNIC may detect the OS or hypervisor type and load switching/routing capabilities specific to that OS or hypervisor. For example, if the OS or hypervisor type is from a particular vendor, the SNIC may load a vendor specific implementation of a virtual switch for that particular vendor as the software used to offload the logical switching/routing from the hypervisor. In general, this may be thought of as the SNIC being smart enough to adapt its own configuration to leverage other devices that the SNIC detects.

In some disclosed implementations, a plurality of SNICs may be utilized in conjunction with one or more ICM. In general, the server-based switch/router functionality may be combined with some of the switch/router functionality in the external switches to which the SNICs are attached. Because the SNICs now have complete knowledge of the virtual network topology up to the virtual machines (VMs) in the server, and the connectivity to the server, these example implementations may now take advantage of tying the knowledge and functionality to offload the switching/routing functions of the external switch to the SNIC (individually or as a group). Specifically, by preprocessing some of the switch/routing capabilities that normally happen in the external switch and performing these functions in a distributed manner (e.g., across multiple servers with an SNIC attached to the switch to provide the additional offload capability), some implementations can significantly reduce the overhead and latency of the switch/routing control and data plane operations in the external physical switch. This reduction to overhead represents just one of several examples of improving the functioning of a computer system disclosed herein.

Referring now to FIG. 1, a network infrastructure device is illustrated using, as an example, switch/router 100. Switch/router 100 is illustrated using a block diagram for simplicity. While FIG. 1 illustrates a general-purpose router, switch/router 100 may perform similar functionality to an ICM as discussed previously in this disclosure. In general, a switch/router 100 has two types of network element components organized onto separate planes illustrated as control plane 110 and data plane 115. In addition, a typical switch/router 100 may include processing resources and local data storage 120. Depending on the capabilities of a particular switch/router 100, different types of processing resources and local storage (for internal device usage) may be present. In general, higher capacity switch/router 100 implementations will include substantial processing resources and memory while simpler (e.g., low capacity) devices will contain less internal resources. SNICs may, in some implementations, be used to allow a simpler switch/router 100 to support a larger more complex network (e.g., because of their offload capability). Additionally, an SNIC may be considered a device that performs functionality historically provided by a switch/router 100 with the implementation executing on the hardware provided by the SNIC.

Control plane 110, for example, in a router may be used to maintain routing tables (or a single comprehensive routing table) that list which route should be used to forward a data packet, and through which physical interface connection (e.g., output ports 160 through 169). Control plane 110 may perform this function by using internal preconfigured directives, called static routes, or by learning routes dynamically using a routing protocol. Static and dynamic routes may be stored in one or more of the routing tables. The control-plane logic may then strip non-essential directives from the table and build a forwarding information base (FIB) to be used by data plane 115.

A router may also use a forwarding plane (e.g., part of the data plane 115) that contains different forwarding paths for information from different ports or different destination addresses (e.g., forwarding path A 116 or forwarding path Z 117). In general, switch/router 100 forwards data packets between incoming (e.g., ports 150-159) and outgoing interface connections (e.g., ports 160-169). Switch/router 100 forwards data packets to the correct network type using information that the packet header contains matched to entries in the FIB supplied by control plane 110. Ports are typically bidirectional and are shown in this example as either "input" or "output" to illustrate flow of a message through a routing path. In some network implementations, a router (e.g., switch/router 100) may have interfaces for different types of physical layer connections, such as copper cables, fiber optic, or wireless transmission. A single router may also support different network layer transmission standards. Each network interface may be used to enable data packets to be forwarded from one transmission system to another. Routers may also be used to connect two or more logical groups of computer devices known as subnets (or network segments), each with a different network prefix.

Also illustrated in FIG. 1, bidirectional arrow 107 indicates that control plane 110 and data plane 115 may work in a coordinated fashion to achieve the overall capabilities of switch/router 100. Similarly, bidirectional arrow 125 indicates that processing and local data storage resources 120 may interface with control plane 110 to provide processing and storage support for capabilities assigned to control plane 110. Bidirectional arrow 130 indicates that processing and local data storage resources 120 may also interface with data plane 115 as necessary.

Control plane 110, as illustrated in FIG. 1, includes several example functional control blocks. Additional control blocks are possible depending on the capabilities of a particular implementation of a switch/router 100. Block 111 indicates that control plane 110 may have associated build information regarding a software version of control code that is currently executing on switch/router 100. In addition, that software version may include configuration settings to determine how switch/router 100 and its associated control code perform the classification and grouping of connected devices into the "Switching and Routing Group" or the "Virtual Passthrough Group" (e.g., as discussed above).

Many different configuration settings for both the software and the device itself are possible and describing each is beyond the scope of this disclosure. However, the disclosed automatic grouping of connections may be implemented in one or more functional sub-systems of switch/router 100. Also, as illustrated in FIG. 2, the capabilities outline for example switch/router 100 (or possible another network infrastructure device) may be implemented through software, firmware, or hardware logic as provided by and executed on the SNIC.

Block 111 further indicates that different types of routing information and connectivity information may be known to switch/router 100 and control plane 110. Block 112 indicates that an information store may be accessible from control plane 110 and include forwarding tables or network address translation (NAT) information as appropriate. Block 113 indicates that control plane 110 may also be aware of forwarding decisions and other processing information. Although FIG. 1 illustrates these logical capabilities within control plane 110 they may actually be implemented outside of, but accessible to, control plane 110.

Figure 2:
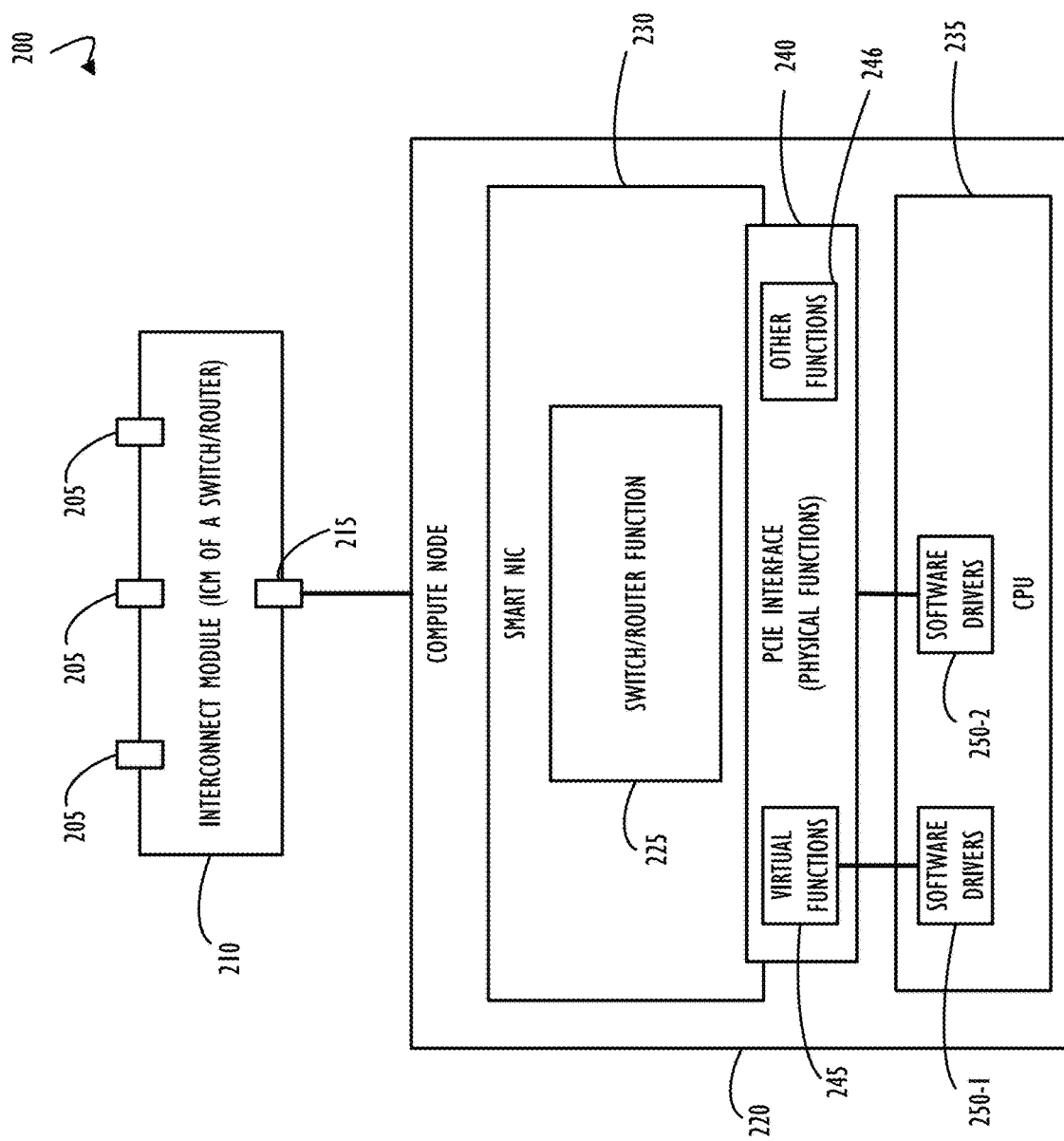
FIG. 2 illustrates a high-level view of an example smart NIC (SNIC) connected to a downlink port on an interconnect module (ICM), according to one or more disclosed implementations.

Before continuing with FIG. 2, the following represents a brief discussion to compare and contrast a physical switch/router 100 with switch/router functionality that may be provided in a virtualized environment. The discussion in this specific section of this disclosure (i.e., until discussion of FIG. 2 begins) presents a high-level overview that may not represent an actual implementation but is provided to facilitate explanation of concepts disclosed herein.

Hypervisor resident software implementations may provide a software based switching routing functionality that differs from the switching/routing functionality that typically occurs in an edge switch that may be interfaced to an ICM or may be a top of rack (TOR) switch in an implementation using rack servers. These are just examples for discussion and not meant to limit this disclosure to those types of devices. As a first point, any logical, virtual, or physical switch/router has two major components: a data plane and a control plane (e.g., data plane 115 and control plane 100 of example switch 100). With respect to a data plane, in a physical switch this is typically implemented as one or more fast hardware-based switching engines that can parse, modify, route, and forward packets from port to port without software intervention (for the most part). The data plane hardware is typically configured to perform its functions properly by the control plane. As explained above, the switch/router device (e.g., switch/router 100) has physical ports which are used to connect to other switches and end point devices like servers. The server NIC ports (to be clear, as used here, NIC represents any type of NIC disclosed herein) are connected to these physical switch ports.

To explain a data plane implementation for a VM environment (e.g., a software version of data plane 115), please consider that in a virtual or logical switch/router in a hypervisor, the data plane is typically implemented as very efficiently written software module (i.e., executable), but it remains software that utilizes CPU cycles (an overhead that therefore cannot be used for applications) and is slower that the hardware-based data planes in physical switches. The virtual or logical switch/router data plane does not have physical ports, but logical downstream ports to the VNIC in the VMs, and the NIC acts as the upstream port(s) of the logical switch/router to connect to the network outside the server. See FIGS. 4A-C below.

To explain a control plane implementation for a VM environment (e.g., a virtualized version of control plane 110), please consider that in physical switches, a control plane is typically implemented as software in an embedded CPU that is connected to a management port of the switch device/hardware. The control plane software configures the switch hardware and receives and transmits switch/router control plane protocol packets with other switches to determine the optimal local switch hardware settings for that particular device. That is, the best available for that device to be configured with respect to configuration information obtained from other network infrastructure components.

In virtual or logical switches in the hypervisor VM environment, the control plane is typically implemented as software that runs on the server's CPU and communicates with the data plane software (function calls, local sockets calls, etc.) to configure the data path software. Accordingly, this control plane software implementation also receives and transmits switch/router control plane protocol packets with other switches that are typically intended for the physical switch connected to the ports of the NIC. This dual receipt of packets may be eliminated (or at least reduced) by offloading this function to an SNIC as disclosed herein. This reduction to overhead represents just one of several examples of improving the functioning of a computer system disclosed herein. End of high-level overview discussion.

Referring now to FIG. 2, a high-level view of an example SNIC usage example 200 is illustrated in accordance with one or more disclosed implementations. SNIC usage example 200 illustrates a compute node 220 including an SNIC 230 that provides a connection between the compute node 220 and ICM 210. Specifically, SNIC 230 is communicatively coupled (on behalf of compute node 220) to downlink port 215 on ICM 210. In the SNIC usage example 200, downlink port 215, provides the network interface connection from ICM 210 to compute devices such as compute node 220. Examples of uplink ports 205 on ICM 210 are also shown; uplinks 205, in this context, refer to connections from ICM 210 to the enterprise network. For purposes of clarity and simplicity, uplink ports 205 are not shown connected to further devices as may exist within an enterprise network (see FIG. 7 for an example of an enterprise network).

As illustrated in SNIC usage example 200, compute node 220 hosts central processing unit (CPU) 235 and SNIC 230 that communicate via a coupling provided by PCIe interface 240. SNIC 230 is further illustrated to include an example switching/routing functional block (e.g., switch/router function 225) that may execute on the general-purpose computing capabilities provided by the SNIC 230 (e.g., by processors and other hardware used to implement SNIC 230 but not shown in this example for clarity of presentation). Further, switch/router functional block 225 represents only one of potentially many functions that SNIC 230 may perform. In some implementations, SNIC 230 may concurrently run one or more functional blocks similar to the switching/routing functional block 225 that may serve purposes other than switching/routing (e.g. firewalls, load balancers, IPSec, etc.). The combinations and purposes of functional blocks that SNIC 230 may execute may be determined by design criteria for that SNIC 230. In one example, SNIC 230 may incorporate one or more function blocks described above for switch/router 100 of FIG. 1.

Continuing with FIG. 2, Virtual Functions (VF) 245 provided by PCIe interface 240 are illustrated as being used by software drivers 250-1 that may be executing inside a virtual machine on CPU 235 of compute node 220. PCIe interface 240 may expose VF 245, a PF, or other functions 246 as a new device type (e.g., other than PF or VF 245). Further, in some implementations, an OS and hypervisor (not shown) may be concurrently executing on CPU 235 of compute node 220. The OS and hypervisor may also communicate to SNIC 230 by using software drivers 250-2 that may, in this example, execute inside the OS that is in turn executing on compute node 220.

Figure 3A:
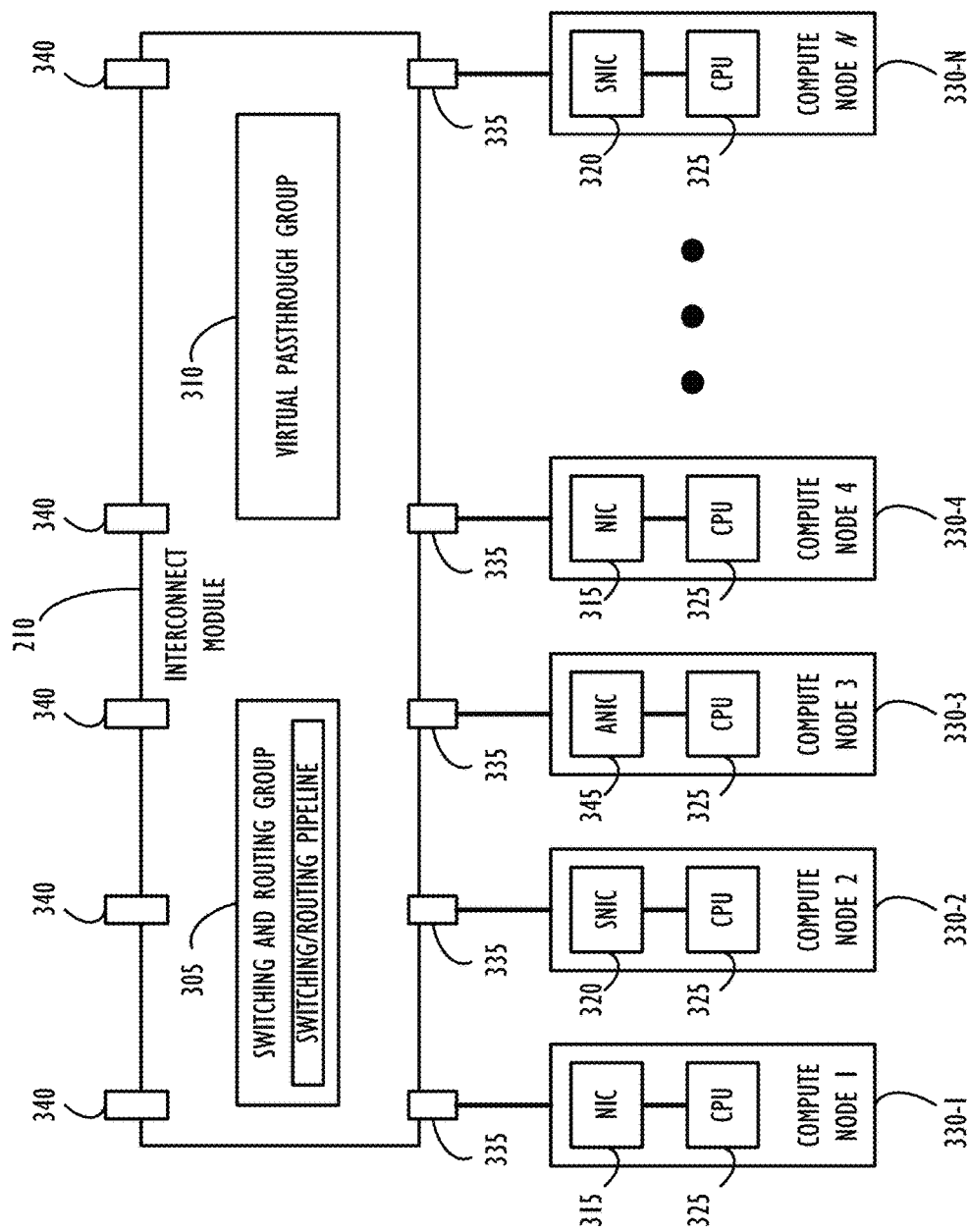
FIG. 3A illustrates an ICM with several variations of compute nodes connected together to the ICM to illustrate an example system configuration, according to one or more disclosed implementations.

Referring now to FIG. 3A, ICM 210 is illustrated as supporting several variations of compute nodes 330-1 through 330-N (collectively referred to as compute nodes 330) connected in configuration 300A to illustrate an example system configuration, according to one or more disclosed implementations. As illustrated in this example, each of compute nodes 330-1 through 330-N may have a different type of NIC and different software configuration. Configuration 300A is only one example and presented to illustrate that a variety of computational capabilities (e.g., software configurations) may be provided by each respective CPU 325 (e.g., based on capabilities of an attached NIC). Each of CPUs 325 may not be identical with respect to the hardware capability provided by that CPU when used an actual implementation, however, CPUs 325 but may be considered equivalent (e.g., with respect to hardware capability and performance) for this example.

In the example of configuration 300A, connectivity to ICM 210 may be facilitated through different types of NICs such as basic NIC 315 (e.g., compute node 330-1 and compute node 330-4), ANIC 345 (e.g., compute node 330-3), or SNIC 320 (e.g., compute node 330-2 and compute node 330-N). As discussed above, compute nodes 330-1, 330-3, and 330-4, that are illustrated to include either a NIC 315 or ANIC 345, may rely on the switching/routing capability of the ICM 210. The ability for a variety of differently configured compute nodes 330 to connect to the ICM 210 may be provided by the ICM 210 having the capability to group connections based on supported functionality. That is, ICM 210 may have the ability to understand that a different division of work for processing network packets may be implemented based on differing capabilities of connected NIC types. For example, compute nodes 330 with connectivity that requires switching/routing capabilities may be assigned to Switching and Routing Group 305. In contrast, compute nodes 330 with SNIC 320 connections to the ICM 210 may be assigned to the Virtual Passthrough Group 310. For connections associated with Virtual Passthrough Group 310, ICM 210 may let the network data pass through to an appropriate SNIC 320 destination without performing the same level of processing for data packets (e.g., as compared to Switching and Routing Group 305. Accordingly, each grouping may be used to more efficiently (e.g., with respect to processing by the ICM and other processors) route network data for bi-directional communication. Note that an SNIC may be configured to not leverage capability of performing all available offload capabilities (e.g., based on system administrator configuration settings as mentioned above) and may therefore be associated with a group based on its current operational configuration as opposed to that SNIC's potential operational configuration.

As will be apparent to those of skill in the art, given the benefit of this disclosure, the use of multiple paths through ICM 210 may allow for an ICM 210 to support a variety of traffic flows by supporting different types of connections concurrently. Specifically, heavy or legacy protocols may be processed by different types of connections and provide compatibility with existing infrastructure. In general, this technique may allow for adoption of compute nodes 330 with SNICs 320 and other network processing in a customer data center without having to alter existing devices (e.g., devices with ANIC 345 or NIC 315).

Further, an implementation of the switching/routing in SNIC 320 combined with the use of Virtual Passthrough Group 310 may allow SNIC 320 to appear as a true switch/router to other network infrastructure devices. This may allow the SNIC 320 implementation of the switching/routing capability to communicate with another switch/router using protocols such as Spanning Tree Protocol (STP) or other protocols that are used to help manage efficient data communication on the network.

As additionally illustrated in configuration 300A, compute nodes 330 may be connected to ICM 210 via downlink ports 335. Downlink ports 335, in the context of this example, refer to the connection from the ICM to compute devices. Examples of uplink ports 340 on ICM 210 are also shown in configuration 300A. Uplinks 340, in the context of this example, refer to the connection from ICM 210 to an enterprise network (not shown). Uplink ports 340 may be targeted for network traffic (e.g., provided network traffic through ICM 210) to and from either of Switching and Routing Group 305 or Virtual Passthrough Group 310 simultaneously. Specifically, the packet editing capabilities provided by SNIC 320 (e.g., SNIC 320 performing a switching/routing function and simple forwarding tables) may allow traffic to flow to Virtual Passthrough Group 310. Virtual Passthrough Group 310 may enable traffic from any downlink port 335 with a connected SNIC 320 to be steered directly to any uplink port 340. That is, the traffic may be provided to uplink port 340 without additional switching/routing processing on ICM 210 (e.g., because that processing is offloaded to SNIC 320). The forwarding rules used to associate traffic with different levels of processing may be based on MAC address, downlink port number, port number and VLAN tag ID, VLAN tag ID only, or any other suitable method.

A compute node 330 with an SNIC 320 connected to ICM 210 may not always be assigned to the Virtual Passthrough Group 310. For example, non-network types of compute nodes 330 with SNICs 320 such as storage types (e.g. iSCSI, FCoE, etc.) may require traditional network processing. Some forms of traditional network processing may not be provided in some implementations of switching/routing functions offloaded from ICM 210 to SNIC 320. As mentioned above, these instances may be identified by a configuration setting provided, for example, by a system administrator or may be automatically detected. In these cases, the network data may bypass the switching/routing acceleration functions in the SNIC 320, pass directly through the SNIC 320 to the connected downlink 335, and then be processed as part of Switch and Routing Group 305 within ICM 210 for forwarding to the interconnect modules uplinks 340 or back to another downlink 335. Thus, additional processing that may "normally" be intended to be offloaded to an SNIC 320 may not be invoked and that instance of SNIC 320 may perform more like a traditional NIC 315 or ANIC 345. Thus, disclosed implementations of SNIC 320 allow for SNIC 320 to perform new functionality on an as-needed basis.

Figure 3B:
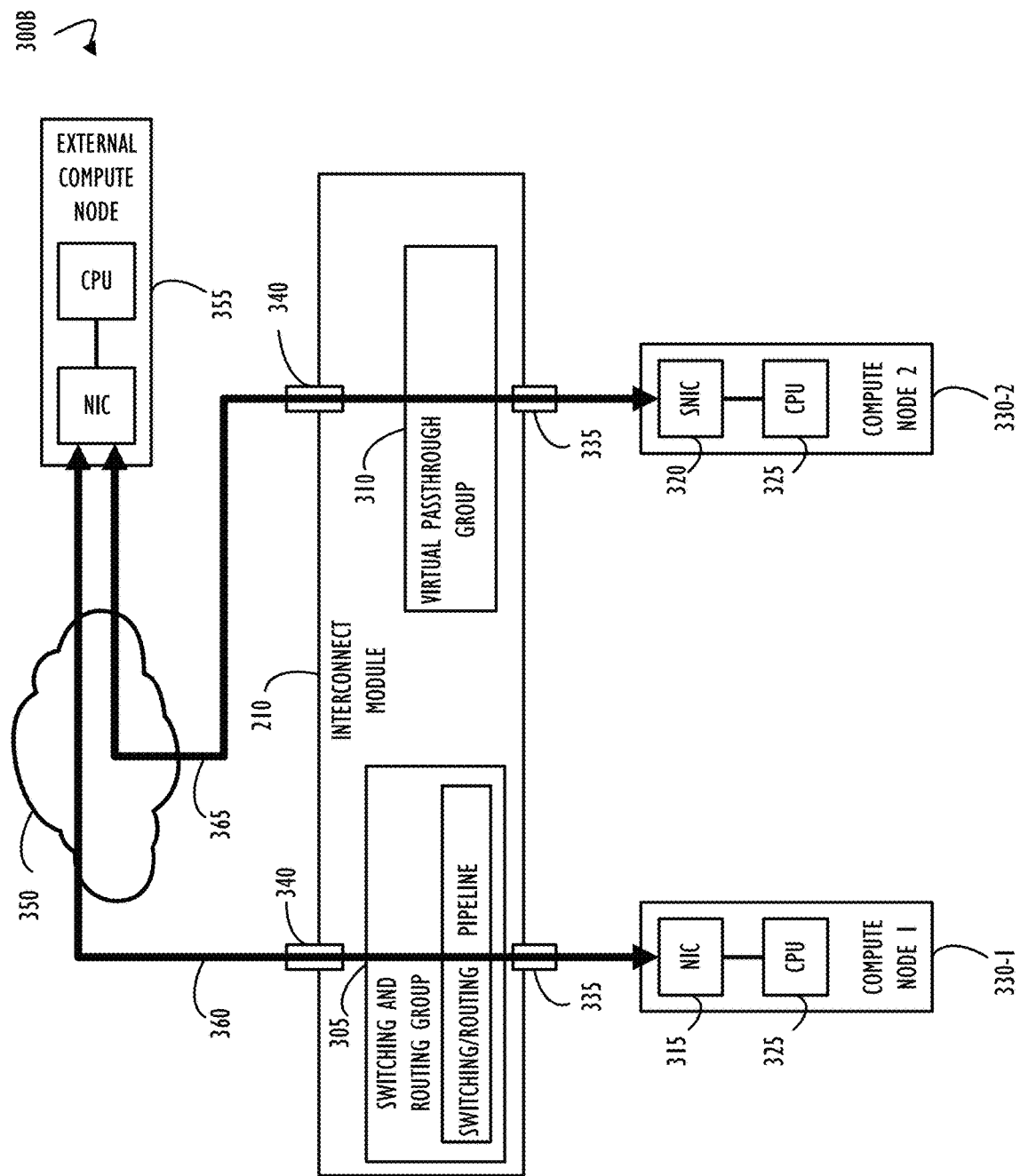
FIG. 3B illustrates an extension to the view of FIG. 3A demonstrating an example data flow from a variety of compute nodes, according to one or more disclosed implementations.

Referring now to FIG. 3B, shown is an illustration of configuration 300B representing an augmented view of a portion of configuration 300A from FIG. 3A. Configuration 300B is illustrated to facilitate a discussion of an example data flow from a variety of compute nodes 330, according to one or more disclosed implementations. In the example of configuration 300B, first data path 360 represents a flow to an external compute node 355 through network 350 from compute node 330-1 having a NIC 315 that is connected to an ICM 210. In this example, first data path 360 flows from compute node 330-1 to downlink port 335 through Switching and Routing Group 305 (e.g., where switching/routing functionality is performed by ICM 210). First data path 360 then continues through uplink port 340 to network 350 and finally arrives at compute node 355. Compute node 355's network connection is not illustrated in detail in this example. Compute node 355 may by connected to the network through an ICM 210 or any other type of network infrastructure device. For purposes of this discussion the connection of compute node 355 to network 350 is not relevant but may be similar to any traditional network connection implementation or the network connection implementations of this disclosure.

A separate second data path 365 is also illustrated in example configuration 300B. Second data path 365 is similar to first data path 360 in that it is a data path between external compute node 355, through network 350, and arrives at ICM 210 via an uplink port 340. However, processing within ICM 210 is different from this point forward for second data path 365. As is illustrated in this example, compute node 330-2 is configured with an SNIC 320 for purposes of communication to external compute node 355. Further, in the case of data path 365, SNIC 320 may provide the switching/routing functions as described above that may be offloaded from ICM 210 to SNIC 320. As a result, data path 365 may therefore be "processed" via Virtual Passthrough Group 310 as part of flowing through ICM 210. Note, processed here is used in quotes to highlight that processing performed by ICM 210 may simply be a forwarding of data packets without additional overhead processing as performed for first data path 360. Accordingly, data flow for second data path 365 may proceed directly from SNIC 320 (with a non-processed passthrough of ICM 210) and onto network 350 on its way to arriving at external compute node 355. Simply put, switching/routing processing performed by ICM 210 for first data path 360 is elided for second data path 365 (e.g., because switching/routing processing was already performed by SNIC 320).

Figure 3C:
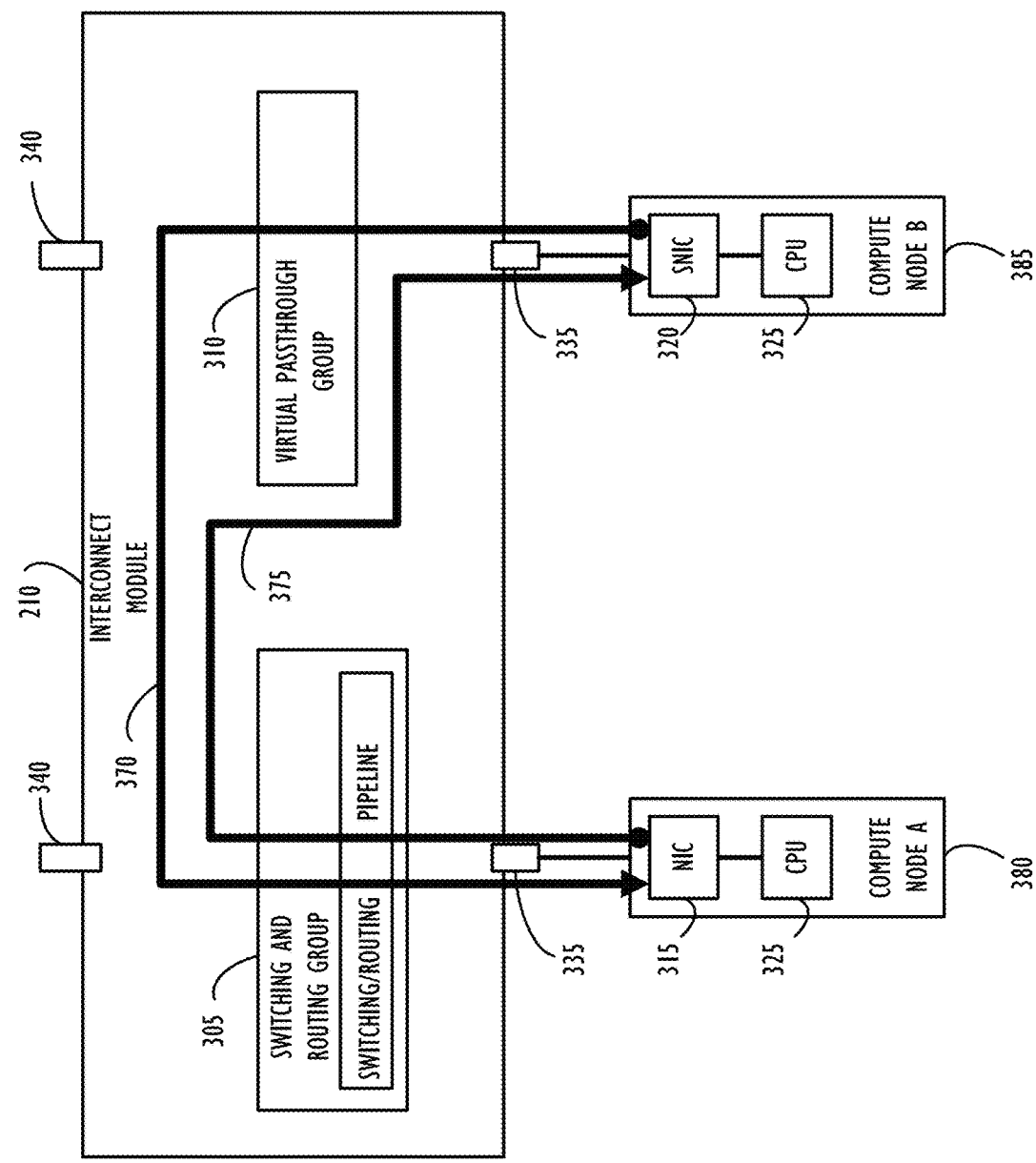
FIG. 3C illustrates yet another extension to the view of FIG. 3A illustrating data flow between two compute nodes connected to the same ICM, according to one or more disclosed implementations.

Referring now to FIG. 3C, shown is an illustration of configuration 300C that represents a variation of configurations 300A and 300B discussed above. Configuration 300C illustrates a first data path 370 and a second data path 375 that are representative of two possible data paths for discussion (e.g., selected from possibly many data paths within ICM 210 between different devices). First data path 370 and second data path 375 are, in this example, between compute node A 380 and compute node B 385 that are connected to the same ICM 210. First data path 370 represents a path for network packets originating at compute node B 385 destined for compute node A 380 (note arrow representation in figure). Second data path 375 represents a path for network packets originating at compute node A 380 destined for compute node B 385. Configuration 300C illustrates how ICM 210 may process and route and process network packets based on a possible division of work between ICM 210 and SNIC 320, according to one or more disclosed implementations.

In configuration 300C, data path 370 is illustrated as originating from compute node B 385 that includes an SNIC 320. As explained above, SNIC 320 may be providing switching/routing capabilities (e.g., based on a division of work negotiated at time of connection between compute node B 385 and ICM 210 (e.g., device connection). As illustrated, first data path 370 flows through the Virtual Passthrough Group 310 when outbound from SNIC 320 and is then routed through the Switching and Routing Group 305 on its outbound path from ICM 210 to arrive at a compute node A 380 (with NIC 315). The outbound flow from ICM 210 through Switching and Routing Group 305 may be provided, in part, because NIC 315 may rely on ICM 210 to providing additionally switching/routing capabilities.

Second data path 375 is illustrated in configuration 300C as traversing between compute node A 380 and compute node B 385 in the reverse direction relative to first data path 370. That is, second data path 375 originates from compute node A 380 and flows into ICM 210 prior to flowing outbound from ICM 210 to compute node B 385 (with SNIC 320). In second data path 375, traffic from compute node A 380 flows through Switching and Routing Group 305 while in ICM 210 and flows out to compute node B 385 without additional overhead of processing within ICM 210. This bypass may occur, in part, because SNIC 320 in compute node B 385 has offloaded switching/routing capability of ICM 210. Thus, ICM 210 may further have the ability to optimize data paths such that delivery of data between connections on the same ICM 210 may be further optimized.

Figure 4A:
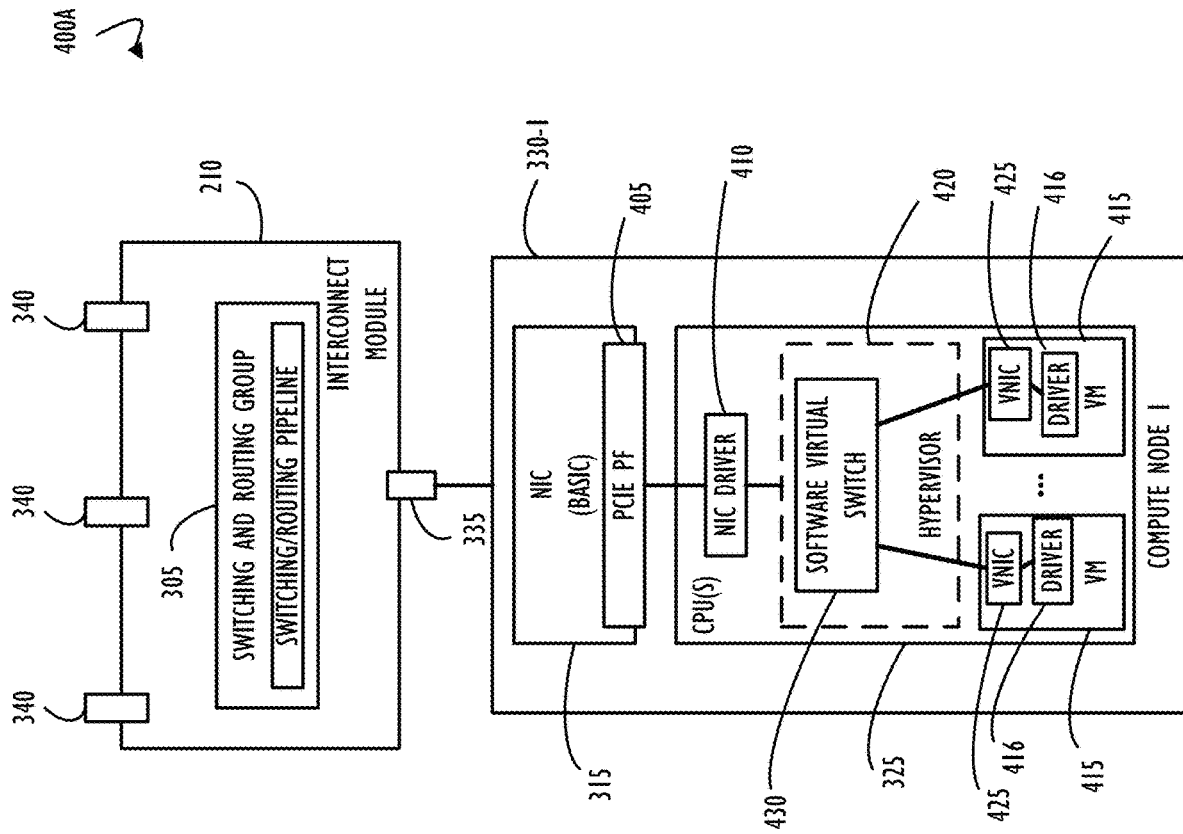
FIG. 4A illustrates a detailed view of an example compute node with a basic NIC (or standard NIC) connected to an ICM, according to one or more disclosed implementations.

Referring now to FIG. 4A, shown is an illustration of configuration 400A providing further details of compute node 1 330-1 that has a basic NIC 315 connected to ICM 210, according to one or more disclosed implementations. In configuration 400A, ICM 210 is illustrated as an abbreviated view of that shown in FIG. 3A. This view is simplified for purposes of this example in that only the Switching and Routing Group functions 305 are shown in the ICM 210. However, all functionality described above may be present in an actual implementation of ICM 210 (e.g., for use in offloading with an SNIC in a hybrid environment of devices as shown in FIG. 3A). As discussed above, basic NIC 315 may rely on the switching/routing capabilities of ICM 210 to properly send and receive network data.

As shown in previous examples, compute node 1 (330-1) may contain one or more CPUs 325 that may interface with NIC 315 having basic functional capabilities. In this example, the interface between CPU 325 and basic NIC 315 is implemented using a PCIe endpoint interface (PCIE PF 405). Other interface types are also possible.

In general, PCIe endpoint interface (PCIE PF 405) may be designed to support one or more PCIe Physical Functions (PFs) where each PF may be one of a number of PCIe function types (e.g., network, storage, etc.). PFs may be typically present on a device and have a driver (e.g., software interface or device-driver illustrated as NIC driver 410) loaded into an operating system of that device. This device-driver style interface may allow the interface to be used by the OS kernel and applications via protocol or service stacks appropriate for the type of PF.

In this example, PCIE PF 405 is for NIC 315 having basic functionality. NIC driver 410 executing on the CPU 325 via the operating system (not shown) may be used provide networking services to any software currently running on the operating system controlling CPU 325. One such piece of software may be hypervisor 420 that is illustrated in this example as hosting software virtual switch 430. Hypervisor 420 may additionally interface with one or more instances of a virtual NIC (VNIC) 425. Each instance of VNIC 425 may be provided as part of one or more instances of VM 415 that are each managed by hypervisor 420 to pass network data between each instance of VM 415, software virtual switch 430, and NIC 315 via NIC driver 410. Each instance of VM 415 may further be executing an instance of its own network driver 416 to interface with instances of VNIC 425.

Elements illustrated in configuration 400A represent traditional elements that may be incorporated with other functionality to achieve the benefits of this disclosure. As mentioned above, this disclosure presents an improvement to traditional network interaction between an ICM (e.g., ICM 210) and a set of or more devices connected to that ICM. A hybrid environment of devices may be supported by disclosed ICM 210 (see FIG. 1) and that hybrid environment may include traditional devices with basic NIC 315 as well as other devices with one or more advanced NIC (e.g., ANIC 345 discussed in detail below with reference to FIG. 4B) and/or a smart NIC (e.g., SNIC 320 discussed in detail below with reference to FIG. 4C). Software virtual switch 430 and instances of VNIC 425 in configuration 400A are illustrated as being implemented as software components in hypervisor 420 and VM 415, respectively. Accordingly, these software components consume cycles of the CPU 325 that may otherwise be utilized to execute compute applications within VMs 415. As discussed throughout this disclosure, offloading functionality to a processor of SNIC 320 may make available additional cycles on CPU 325 and therefore improve overall performance of computer systems that utilize SNIC 320.

Figure 4B:
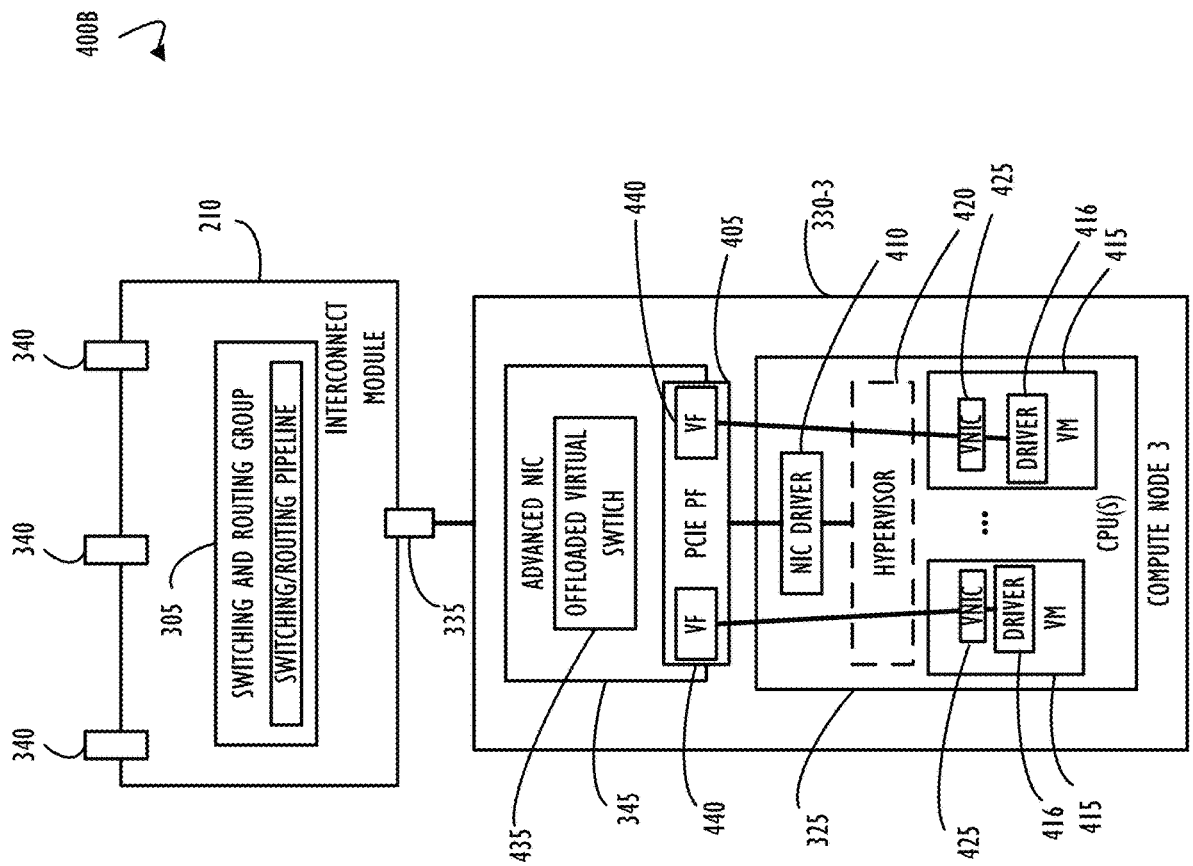
FIG. 4B illustrates a detailed view of an example compute node with an advanced NIC (ANIC) connected to an ICM, according to one or more disclosed implementations.

Referring now to FIG. 4B, shown is an illustration of configuration 400B providing further details of compute node 1 330-3 that has an advanced NIC (e.g., ANIC 345) connected to ICM 210, according to one or more disclosed implementations. In configuration 400B, ICM 210 is illustrated as an abbreviated view of that shown for ICM 210 in FIG. 3A. This view is simplified for purposes of this example in that only the Switching and Routing Group functions 305 are shown in the ICM 210. However, all functionality described above may be present in an actual implementation of ICM 210 (e.g., for use in offloading with an SNIC in a hybrid environment of devices as shown in FIG. 3A). As discussed above, ANIC 345 may rely on the switching/routing capabilities of ICM 210 to properly send and receive network data.

Note that configuration 400B illustrates how software virtual switch 430 (from configuration 400A of FIG. 4A) is no longer present. The switching previously provided by software virtual switch 430 is, in this example, offloaded to the ANIC 345 through the offloaded virtual switch 435. Offloaded virtual switch 435 utilizes a PCIe endpoint interface, illustrated as PCIE PF 405 to provide instances of a Virtual Function (VF) 440 that may be utilized by drivers (e.g., illustrated as driver 416) executing in each instance of VM 415. An improvement to CPU 325 may be realized in configuration 400B based on offloaded virtual switch 435 no longer consuming CPU 325 cycles that would have previously (e.g., in configuration 400A) been utilized by software virtual switch. Thus, use of ANIC 345 as illustrated in configuration 400B represents an improvement over that of configuration 400A with respect to use of CPU 325 for network traffic processing.

Note, that although configuration 400B represents an improvement over configuration 400A, further improvements using techniques in accordance with this disclosure are also possible and explained next. Specifically, configuration 400B illustrates how some performance improvement may be achieved through the use of the offloaded virtual switch 435. However, note that the functions of Switching and Routing Group 305 in ICM 210 are still present for both NIC 315 having basic capability as illustrated in configuration 400A and for ANIC 345 having advanced capability as illustrated in configuration 400B.

Figure 4C:
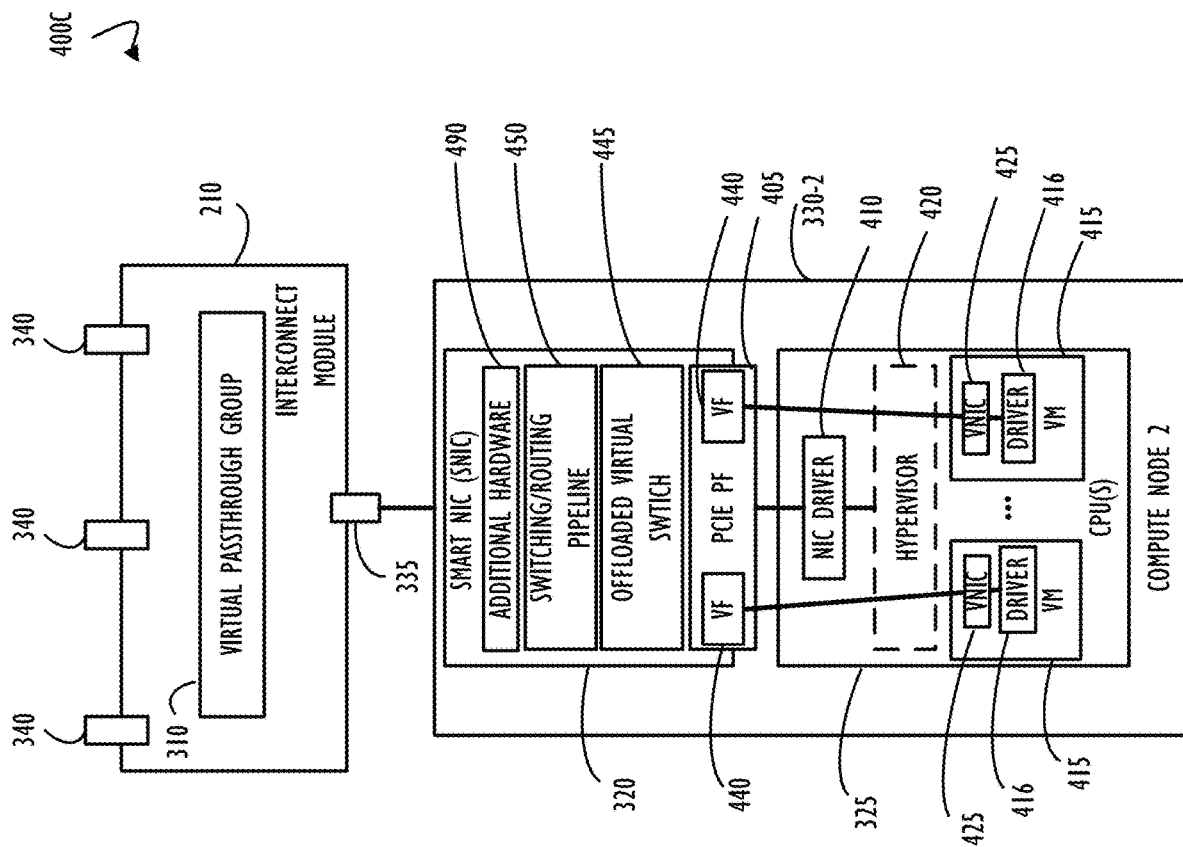
FIG. 4C illustrates a detailed view of an example compute node with a smart NIC (SNIC) connected to an ICM, according to one or more disclosed implementations.

Referring now to FIG. 4C, shown is an illustration of configuration 400C providing further details of compute node 2 330-2 that has a smart NIC (e.g., SNIC 320) connected to ICM 210, according to one or more disclosed implementations. In configuration 400C, ICM 210 is illustrated as an abbreviated view of that shown for ICM 210 in FIG. 3A. This view is simplified for purposes of this example in that only Virtual Passthrough Group functions 310 are shown in ICM 210. However, all functionality described above may be present in an actual implementation of ICM 210 (e.g., for supporting devices having either a NIC 315 and/or ANIC 345 in a hybrid environment of devices as shown in FIG. 3A). As discussed above, NIC 315 and ANIC 345 may rely on the switching/routing capabilities (not shown in configuration 300C) of ICM 210 to properly send and receive network data.

In the example of configuration 400C, SNIC 320 may be considered to have at least the same capabilities as ANIC 345 (explained in configuration 400B above). Additionally, SNIC 320 of configuration 400C may further have one or more capabilities provided using additional hardware 490 such as programmable embedded processing units, hardware accelerators, and other elements commonly found in general computing platforms. Additional hardware 490 may be utilized to provide the additional capabilities (e.g., switching and routing processing) as discussed for SNIC 320 throughout this disclosure. The capabilities of SNIC 320 may then enable allowing switching/routing functions typically found in ICM 210 to be offloaded (e.g., distributed) to SNIC 320 using a negotiated division of work between ICM 210 and SNIC 320. Offloading the functions of ICM 210 to SNIC 320 may reduce processing load on control plane CPUs in ICM 210 and improve performance by distributing the functionality across the SNIC 320 instead of performing that same processing locally on ICM 210. Further, processing required by Virtual Passthrough Group 310 functions may be reduced over that performed for switching and routing group 305 from configuration 400B that is notably longer present in configuration 400C. Specifically, processing within ICM 210 may be reduced because network traffic may be forwarded to SNIC 320 for switching/routing (e.g., bypassing switching/routing functions by being grouped to Virtual Passthrough Group 310).

FIG. 4C further illustrates that in a similar manner to configuration 400B, configuration 400C may include offloaded virtual switch 445 to be executed in SNIC 320 and network interfaces provided to instances of VM 415 may be interfaced through instances of PCIE VF 440. However, in addition to offloaded virtual switch 445, switching/routing capability 450 typically present in ICM 210 may now execute in SNIC 320 (e.g., it is offloaded from ICM 210 to SNIC 320). The implementation of the switching/routing functions in SNIC 320 may allow SNIC 320 to participate in the use of switching/routing protocols such as Border Gateway Protocol (BGP), Open Shortest Path Forwarding (OSPF), Spanning Tree Protocol (STP), etc. These protocols are often used to assist in the management of the network to ensure data is transmitted efficiently on the network. Accordingly, configuration 400C represents an improvement over that of configuration 400B and configuration 400A with respect to offloading capability provided to ICM 210. As a result, performance of ICM 210 may be improved based on its reduction in workload that has been divided between ICM 210 and SNIC 320 (e.g., the above referenced division of work).

Figure 5:
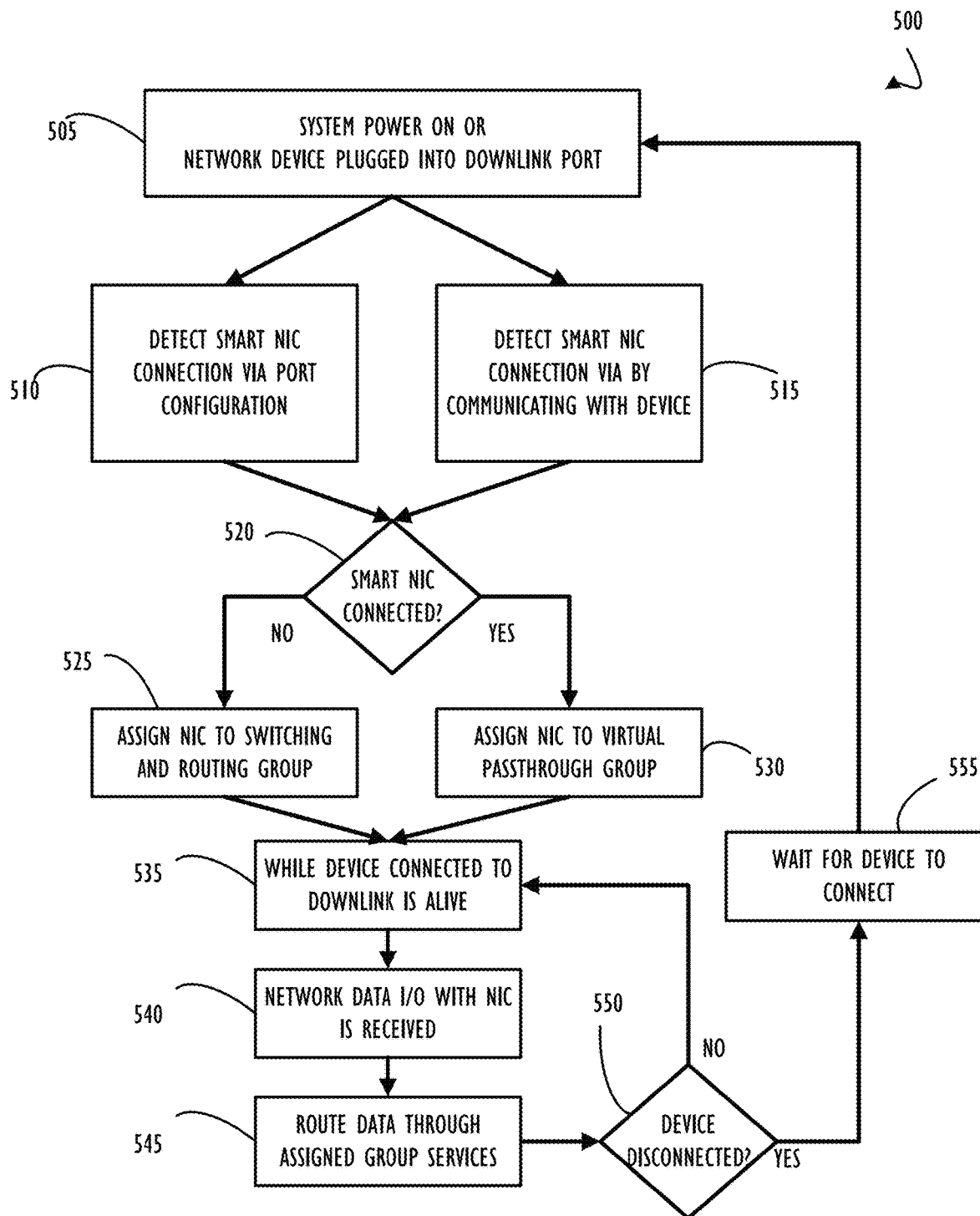
FIG. 5 illustrates an example method that may be executed for ICM group assignment for connected compute nodes, according to one or more disclosed implementations.

Referring now to FIG. 5, shown is an example a method 500 that may be implemented by executing instructions on a processing device to process network traffic by associating data flow with a processing group type within an ICM (e.g., ICM 210 discussed above). Example method 500 may include group assignment for connected compute nodes (e.g., compute nodes 330 discussed above) to provide a division of work (e.g., controlled offloading) between a network infrastructure device and different types of NICs (e.g., standard NIC, advanced NIC, or smart NIC as explained throughout this disclosure).

Example method 500 begins at block 505 where processing begins when an ICM is initialized (e.g., based on a power on event or a reset event) or a new network device is connected to (e.g., plugged in) the ICM (e.g., reconfigured at run-time). In the case of initialization, the ICM may perform a reconfiguration of all uplinks and downlinks. In the case of device connection (or disconnection), the ICM may perform a subset of functions that may be specific to a subset of all uplinks and downlinks (e.g., only the affected uplink and/or downlink).

Block 510 and block 515 represent different possible types of detection that may be possible as part of the setup processing for an SNIC (e.g., SNIC 320 discussed in more detail above). Each of block 510 and block 515 may represent part of the implementation to determine if a device (e.g., the SNIC itself or a specific compute node connected to the ICM via the SNIC) should be assigned to the Virtual Passthrough Group or the Switching and Routing Group (see FIGS. 3A-C and their associated discussion above). In the example of method 500, block 510 indicates that a device may be identified through port configuration performed by a system administrator (e.g. devices plugged into certain ports are assumed to have an SNIC). Block 515 illustrates one possible alternative to a system administrative configuration. Block 515 indicates that the ICM may communicate with the connected interface to determine if the interface has functionality of an SNIC. This communication may be thought of as a plug-n-play type auto-configuration of the ICM based on capabilities of an attached interface. As part of detection, the ICM and SNIC may share information about available capabilities of the SNIC. Thus, an SNIC may advertise its capabilities to an ICM and, based on those available capabilities, the ICM may determine automatically how to properly offload (e.g., implement a division of work) functionality for the SNIC from the ICM. Note that different SNICs may have different capabilities that may be determined by their design criteria, hardware design, software configuration, configuration settings, etc. Accordingly, an ICM may query or otherwise exchange information with an SNIC to negotiate a proper division of work as part of instantiating communications through that SNIC.

Example method 500 continues to decision block 520 where the detection phase (e.g., detection of NIC type) may be evaluated. Example method 500, for simplicity, is limited to provide offload processing for an associated SNIC based on detection of the SNIC. Detection of a NIC type other than an SNIC causes example method 500 to continue to block 525 through the "NO" prong of block 520. In block 525, the device is assigned to the Switching and Routing Group as a default where division of work processing may be skipped such that ICM does not offload any functionality associated therewith. Note, that future devices may have capabilities exceeding that of an SNIC and may be processed accordingly without defaulting to block 525. Returning to decision 520, If the connected device is connected via an SNIC, example method 500 continues to block 530 through the "YES" prong of block 520. In block 530, the device may be assigned to the Virtual Passthrough Group (see FIGS. 3A-C and their associated discussion above).

After the connected device is assigned to a processing group (e.g., a group type determination has been made by the ICM) and a possible division of work has been established, example method 500 continues to block 535 where a connection loop (e.g., note return from decision 550) may be implemented to repeatedly determine if the connected device remains connected and functioning to the ICM port just configured. Block 540 indicates that network data input and output may be received over time by an ICM. Block 545 indicates that any received network data may be routed by the ICM for appropriate handing based on a group assignment of the connected device. That is, the ICM will perform its processing of the network data in conformance with a current division of work as identified previously and noted via the group type determination.

Example method 500 continues to decision block 550, At block 550 a disconnection check may be made to determine whether the connected device is still connected and functioning. If the device fails the disconnection test at block 550 (e.g., remains available), example method 500 returns to block 535 through the "NO" prong of block 550 to complete the connection loop noted with respect to block 535. However, if the device has become disconnected (e.g., no longer available), example method 500 continues to block 555 through the "YES" prong of block 550. Example method 500 may remain in block 555 until the ICM is powered off, another device is connected to the ICM, or further processing to free resources used as part of a previous connection are executed. Of course, as illustrated in example method 500, should another device be connected to the ICM, processing may return to block 505 where the process of assigning the connected device to a group begins again.

Figure 6:
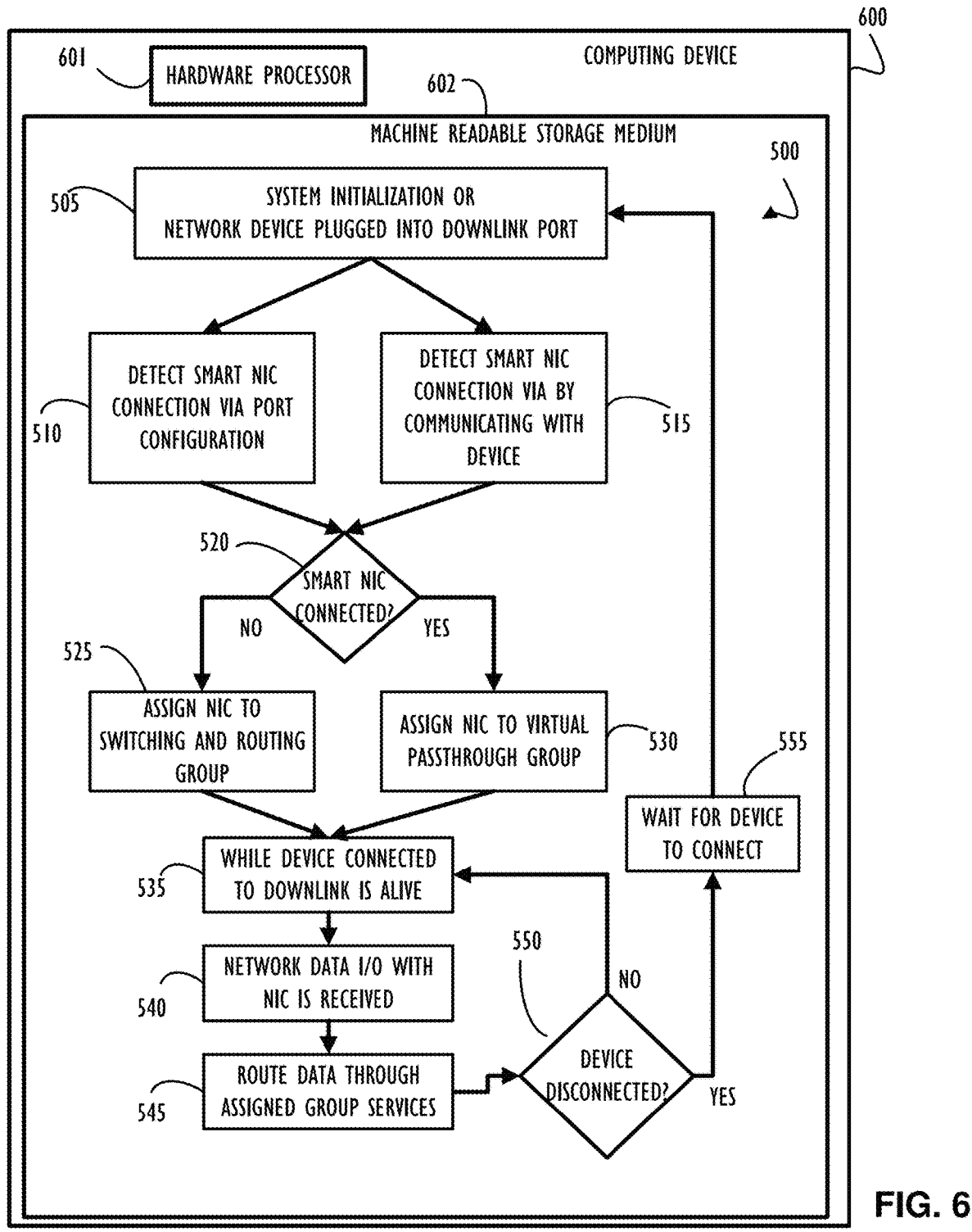
FIG. 6 illustrates an example computing device, with a hardware processor, and accessible machine-readable instructions stored on a machine-readable medium that may be used to implement ICM group assignment for connected compute nodes as provided in the example method of FIG. 5, according to one or more disclosed example implementations.

Referring to FIG. 6, shown is an example computing device 600, with a hardware processor 601, and accessible machine-readable instructions stored on a machine-readable storage medium 602 that may be used to implement ICM group assignment for connected compute nodes as explained above for example method 500, according to one or more disclosed example implementations. Hardware processor 601 may also be referred to by those of ordinary skill in the art as a processing unit, processing device, processor or some other term considered appropriate for a general purpose programmable integrated circuit. FIG. 6 illustrates computing device 600 configured to perform the flow of example method 500. However, computing device 600 may also be configured to perform the flow of other methods, techniques, functions, or processes described in this disclosure. In this example of FIG. 6, machine-readable storage medium 602 includes instructions to cause hardware processor 601 to perform blocks 505-555 discussed above with reference to FIG. 5.

A machine-readable storage medium, such as 602 of FIG. 6, may include both volatile and nonvolatile, removable and non-removable media, and may be any electronic, magnetic, optical, or other physical storage device that contains or stores executable instructions, data structures, program module, or other data accessible to a processor, for example firmware, erasable programmable read-only memory (EPROM), random access memory (RAM), non-volatile random access memory (NVRAM), optical disk, solid state drive (SSD), flash memory chips, and the like. The machine-readable storage medium may be a non-transitory storage medium, where the term "non-transitory" does not encompass transitory propagating signals.

Figure 7:
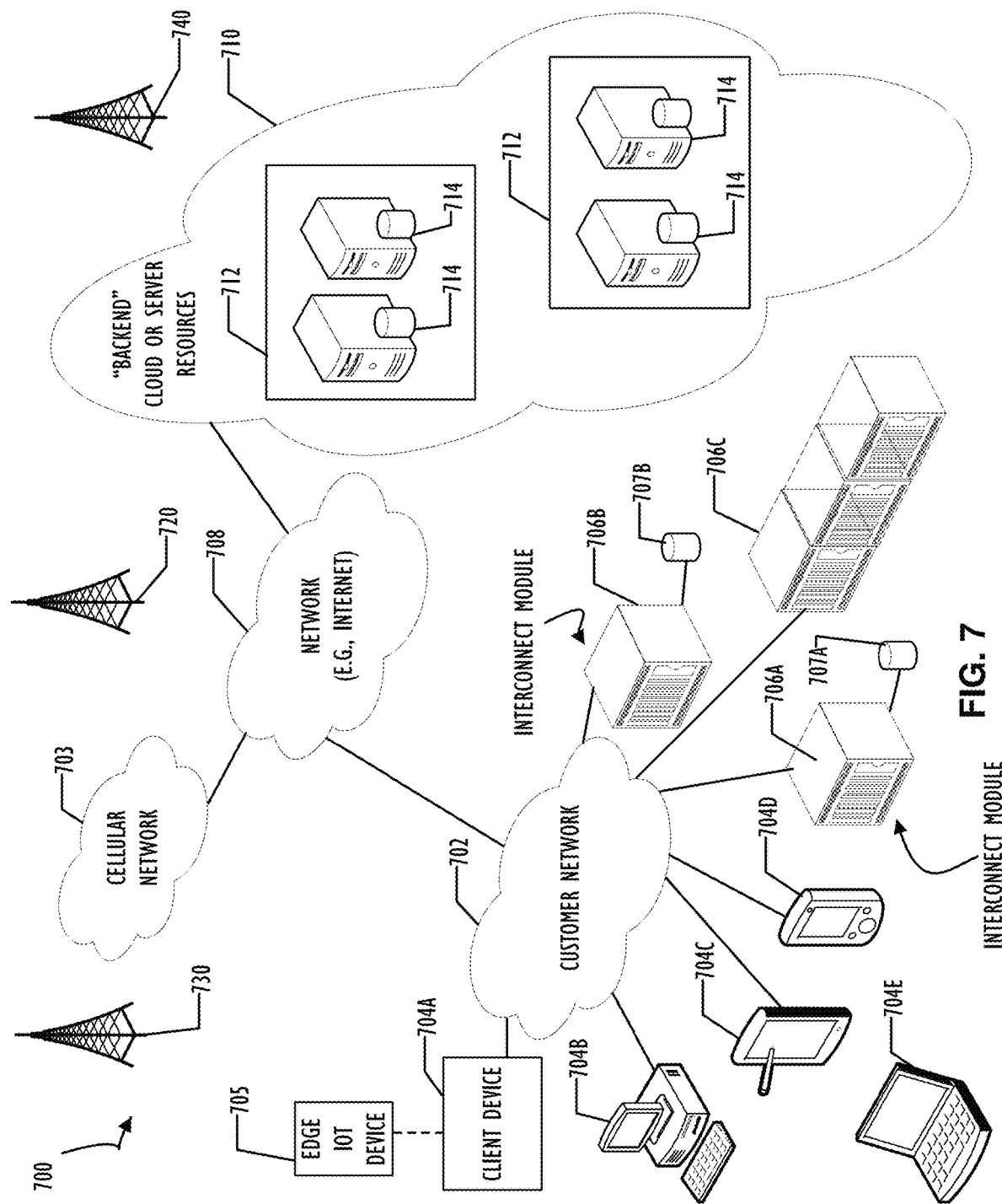
FIG. 7 presents a computer network infrastructure that may be used to implement all or part of the disclosed ICM group assignment for connected compute nodes, according to one or more disclosed implementations.

FIG. 7 represents a computer network infrastructure 700 where implementations of all or part of the disclosed ICM group assignment and SNIC processing offloading may be present for one or more connected compute nodes, according to one or more disclosed implementations. Network infrastructure 700 includes a set of networks where implementations of the present disclosure may operate in one or more of the different networks. Network infrastructure 700 comprises a customer network 702, network 708, cellular network 703, and a cloud service provider network 710. In one implementation, the customer network 702 may be a local private network, such as local area network (LAN) that includes a variety of network devices that include, but are not limited to switches, servers, and routers.

Each of these networks may contain wired or wireless programmable devices and operate using any number of network protocols (e.g., TCP/IP) and connection technologies (e.g., WiFi® networks, or Bluetooth®. In another implementation, customer network 702 represents an enterprise network that could include or be communicatively coupled to one or more local area networks (LANs), virtual networks, data centers and/or other remote networks (e.g., 708, 710). In the context of the present disclosure, customer network 702 may include one or more high-availability switches or network devices using methods and techniques such as those described above. For example, as noted in FIG. 7, devices to provide compute resources 706A and/or 706B may incorporate one or more of the above disclosed interconnect modules. Accordingly, compute devices 706A and/or 706B may support a hybrid set of connections based on various types of NICs (e.g., a mix of NIC, SNIC, and ANIC interfaces as discussed for FIG. 1).

As shown in FIG. 7, customer network 702 may be connected to one or more client devices 704A-E and allow the client devices 704A-E to communicate with each other and/or with cloud service provider network 710, via network 708 (e.g., Internet). Client devices 704A-E may be computing systems such as desktop computer 704B, tablet computer 704C, mobile phone 704D, laptop computer (shown as wireless) 704E, and/or other types of computing systems generically shown as client device 704A.

Network infrastructure 700 may also include other types of devices generally referred to as Internet of Things (IoT) (e.g., edge IOT device 705) that may be configured to send and receive information via a network to access cloud computing services or interact with a remote web browser application (e.g., to receive configuration information).

FIG. 7 also illustrates that customer network 702 includes local compute resources 706A-C that may include a server, access point, router, or other device configured to provide for local computational resources and/or facilitate communication amongst networks and devices. For example, local compute resources 706A-C may be one or more physical local hardware devices, such as the network infrastructure devices outlined above that may include SNICs to offload switching/routing functionality. Local compute resources 706A-C may also facilitate communication between other external applications, data sources (e.g., 707A and 707B), and services, and customer network 702.

Network infrastructure 700 also includes cellular network 703 for use with mobile communication devices. Mobile cellular networks support mobile phones and many other types of mobile devices such as laptops etc. Mobile devices in network infrastructure 700 are illustrated as mobile phone 704D, laptop computer 704E, and tablet computer 704C. A mobile device such as mobile phone 704D may interact with one or more mobile provider networks as the mobile device moves, typically interacting with a plurality of mobile network towers 720, 730, and 740 for connecting to the cellular network 703.

FIG. 7 illustrates that customer network 702 is coupled to a network 708. Network 708 may include one or more computing networks available today, such as other LANs, wide area networks (WAN), the Internet, and/or other remote networks, in order to transfer data between client devices 704A-D and cloud service provider network 710. Each of the computing networks within network 708 may contain wired and/or wireless programmable devices that operate in the electrical and/or optical domain.

In FIG. 7, cloud service provider network 710 is illustrated as a remote network (e.g., a cloud network) that is able to communicate with client devices 704A-E via customer network 702 and network 708. The cloud service provider network 710 acts as a platform that provides additional computing resources to the client devices 704A-E and/or customer network 702. In one implementation, cloud service provider network 710 includes one or more data centers 712 with one or more server instances 714. Cloud service provider network 710 may also include one or more frames or clusters (and cluster groups) representing a scalable compute resource that may benefit from the techniques of this disclosure. Also, cloud service providers typically require near perfect uptime availability and may use the disclosed techniques, methods, and systems to provide that level of service.

Figure 8:
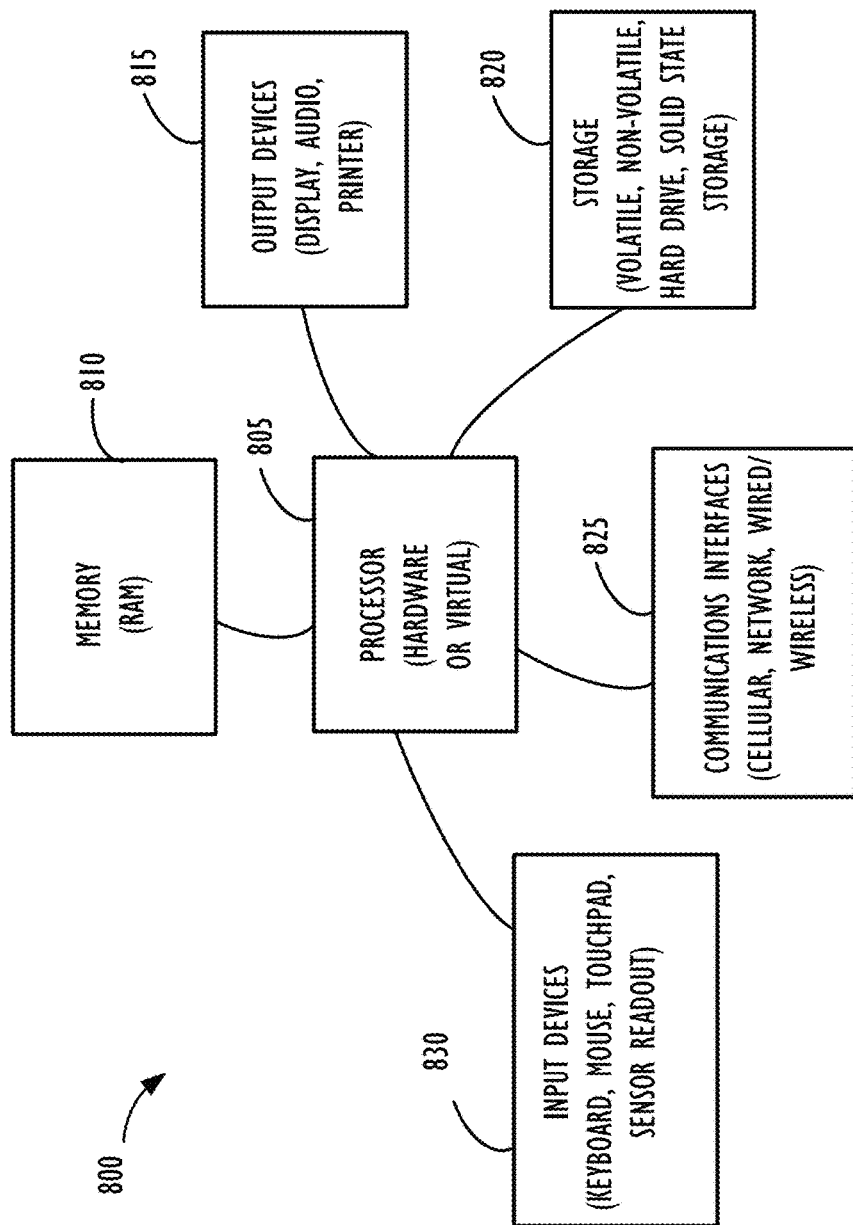
FIG. 8 illustrates a computing device that may be used to implement the functions, modules, processing platforms, execution platforms, communication devices, and other methods and processes of this disclosure.

FIG. 8 illustrates a computing device 800 that may be used to implement or be used with the functions, modules, processing platforms, execution platforms, communication devices, and other methods and processes of this disclosure. For example, computing device 800 illustrated in FIG. 8 could represent a client device or a physical server device and include either hardware or virtual processor(s) depending on the level of abstraction of the computing device. In some instances (without abstraction), computing device 800 and its elements, as shown in FIG. 8, each relate to physical hardware. Alternatively, in some instances one, more, or all of the elements could be implemented using emulators or virtual machines as levels of abstraction. In any case, no matter how many levels of abstraction away from the physical hardware, computing device 800 at its lowest level may be implemented on physical hardware.

As also shown in FIG. 8, computing device 800 may include one or more input devices 830, such as a keyboard, mouse, touchpad, or sensor readout (e.g., biometric scanner) and one or more output devices 815, such as displays, speakers for audio, or printers. Some devices may be configured as input/output devices also (e.g., a network interface or touchscreen display).

Computing device 800 may also include communications interfaces 825, such as a network communication unit that could include a wired communication component and/or a wireless communications component, which may be communicatively coupled to processor 805. The network communication unit may utilize any of a variety of proprietary or standardized network protocols, such as Ethernet, TCP/IP, to name a few of many protocols, to effect communications between devices. Network communication units may also comprise one or more transceiver(s) that utilize the Ethernet, power line communication (PLC), WiFi, cellular, and/or other communication methods.

As illustrated in FIG. 8, computing device 800 includes a processing element such as processor 805 that contains one or more hardware processors, where each hardware processor may have a single or multiple processor cores. In one implementation, the processor 805 may include at least one shared cache that stores data (e.g., computing instructions) that are utilized by one or more other components of processor 805. For example, the shared cache may be a locally cached data stored in a memory for faster access by components of the processing elements that make up processor 805. In one or more implementations, the shared cache may include one or more mid-level caches, such as level 2 (L2), level 3 (L3), level 4 (L4), or other levels of cache, a last level cache (LLC), or combinations thereof. Examples of processors include but are not limited to a central processing unit (CPU) a microprocessor. Although not illustrated in FIG. 8, the processing elements that make up processor 805 may also include one or more of other types of hardware processing components, such as graphics processing units (GPU), application specific integrated circuits (ASICs), field-programmable gate arrays (FPGAs), and/or digital signal processors (DSPs).

FIG. 8 illustrates that memory 810 may be operatively and communicatively coupled to processor 805. Memory 810 may be a non-transitory medium configured to store various types of data. For example, memory 810 may include one or more storage devices 820 that comprise a non-volatile storage device and/or volatile memory. Volatile memory, such as random-access memory (RAM), can be any suitable non-permanent storage device. The non-volatile storage devices 820 can include one or more disk drives, optical drives, solid-state drives (SSDs), tap drives, flash memory, read only memory (ROM), and/or any other type of memory designed to maintain data for a duration of time after a power loss or shut down operation. In certain instances, the non-volatile storage devices 820 may be used to store overflow data if allocated RAM is not large enough to hold all working data. The non-volatile storage devices 820 may also be used to store programs that are loaded into the RAM when such programs are selected for execution.

Persons of ordinary skill in the art are aware that software programs may be developed, encoded, and compiled in a variety of computing languages for a variety of software platforms and/or operating systems and subsequently loaded and executed by processor 805. In one implementation, the compiling process of the software program may transform program code written in a programming language to another computer language such that the processor 805 is able to execute the programming code. For example, the compiling process of the software program may generate an executable program that provides encoded instructions (e.g., machine code instructions) for processor 805 to accomplish specific, non-generic, particular computing functions.

After the compiling process, the encoded instructions may then be loaded as computer executable instructions or process steps to processor 805 from storage device 820, from memory 810, and/or embedded within processor 805 (e.g., via a cache or on-board ROM). Processor 805 may be configured to execute the stored instructions or process steps in order to perform instructions or process steps to transform the computing device into a non-generic, particular, specially programmed machine or apparatus. Stored data, e.g., data stored by a storage device 820, may be accessed by processor 805 during the execution of computer executable instructions or process steps to instruct one or more components within the computing device 800.

A user interface (e.g., output devices 815 and input devices 830) can include a display, positional input device (such as a mouse, touchpad, touchscreen, or the like), keyboard, or other forms of user input and output devices. The user interface components may be communicatively coupled to processor 805. When the output device is or includes a display, the display can be implemented in various ways, including by a liquid crystal display (LCD) or a cathode-ray tube (CRT) or light emitting diode (LED) display, such as an organic light emitting diode (OLED) display. Persons of ordinary skill in the art are aware that the computing device 800 may comprise other components well known in the art, such as sensors, powers sources, and/or analog-to-digital converters, not explicitly shown in FIG. 8.

Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various implementations of the present disclosure. Numerous variations and modifications will become apparent to those skilled in the art once the above disclosure is fully appreciated. It is intended that the following claims be interpreted to embrace all such variations and modifications.

What is claimed is:

1. An interconnect module (ICM), the ICM comprising:
  a processing device;
  at least two ports communicatively coupled to the processing device, the at least two ports to provide inter-device communications on a set of interconnected networks; and
  a non-transitory storage medium readable by the processing device and storing instructions, that when executed by the processing device, cause the ICM to:
    obtain information pertaining to a first set of capabilities of a first network interface card (NIC) associated with a first device connected to a first port of the at least two ports of the ICM, the first device communicating on a first network of the set of interconnected networks;
    determine from the obtained information that the first NIC represents a smart NIC (SNIC), wherein the SNIC performs a function of switching and routing and performs at least one function other than switching and routing;
    send information pertaining to capabilities of the ICM to the first NIC;
    classify the first NIC in a group that allows the ICM to offload the capabilities of the ICM to the first NIC;
    based on the classification, send outbound network traffic without processing from the ICM to the first NIC for switching and routing;
    identify a division of work between the ICM and SNIC to determine a portion of processing that is to be bypassed on the ICM for a first portion of inbound network traffic from the SNIC to the ICM, in part, because the division of work indicates that the portion of processing is performed on the SNIC for the first portion of inbound network traffic prior to arrival of the first portion of inbound network traffic at the ICM, wherein the first portion of inbound network traffic is generated at least in part by the function of switching and routing performed by the SNIC;
    provide at least two data paths for network traffic flow through the ICM, the first data path of the at least two data paths associated with a virtual passthrough group, the virtual passthrough group associated with the first portion of inbound network traffic, the second data path of the at least two data paths associated with both a switching and routing group and a second portion of inbound network traffic; and
    perform switching and routing processing for the second portion of inbound traffic associated with both the second data path and the switching and routing group, in part, because the portion of processing has not been performed for the second portion of inbound traffic prior to arrival at the ICM, wherein the second portion of inbound traffic is generated at least in part by the at least one function other than switching and routing performed by the SNIC.

2. The ICM of claim 1, wherein the second data path is further associated with a second device connected to a second port of the at least two ports.

3. The ICM of claim 1, wherein the instructions further comprise instructions to cause the ICM to:
  receive a network packet from the first device; and
  provide the network packet as outbound network traffic without altering contents of the network packet.

4. The ICM of claim 3, wherein the instructions to provide the network packet as outbound network traffic without altering contents of the network packet comprise instructions to provide the network packet as outbound network traffic via the virtual passthrough group to bypass switching and routing functions of the ICM.

5. The ICM of claim 1, wherein the instructions to obtain information pertaining to the first set of capabilities of the first network interface card (NIC) associated with the first device connected to the first port of the at least two ports of the ICM comprise instructions to negotiate between the ICM and the first device to determine processing to be performed for traffic from the first device prior to arrival at the ICM.

6. The ICM of claim 1, wherein the instructions to obtain information pertaining to the first set of capabilities of the first network interface card (NIC) associated with the first device connected to the first port of the at least two ports of the ICM comprise instructions to read configuration attributes associated with the first NIC to determine processing to be performed for traffic from the first device prior to arrival at the ICM.

7. The ICM of claim 1, wherein the instructions to obtain information pertaining to the first set of capabilities of the first network interface card (NIC) comprise instructions that execute responsive to detection of a connection between the first NIC and the ICM.

8. The ICM of claim 1, wherein the instructions to obtain information pertaining to the first set of capabilities of the first network interface card (NIC) comprise instructions that execute responsive to initialization of the ICM.

9. The ICM of claim 8, wherein initialization of the ICM comprises an initialization responsive to at least one of: reset of the ICM, restart of the ICM, power on of the ICM, reset of one or more ports of the ICM, enabling the first port, and a failover action associated with the ICM.

10. The ICM of claim 1, wherein the instructions further comprise instructions to cause the ICM to:
obtain second information pertaining to a second set of capabilities of a second network interface card (NIC) associated with a second device connected to a second port of the at least two ports of the ICM, the second device communicating on the first network of the set of interconnected networks;
determine from the obtained second information that the second set of capabilities lack capability to preprocess network traffic data prior to arrival at the ICM; and
associate the second NIC with the second data path.

11. A method of processing network packets within an interconnect module (ICM) of a network infrastructure device, the method comprising:
obtaining information pertaining to a first set of capabilities of a first network interface card (NIC) associated with a first device connected to a first port of at least two ports of the interconnect module (ICM), the first device communicating on a first network of a set of interconnected networks;
determining from the obtained information that the first NIC represents a smart NIC (SNIC), wherein the SNIC performs a function of switching and routing and performs at least one function other than switching and routing;
sending information pertaining to capabilities of the ICM to the first NIC;
classifying the first NIC in a group that allows the ICM to offload the capabilities of the ICM to the first NIC;
based on the classification, sending outbound network traffic without processing from the ICM to the first NIC for switching and routing;
identifying a division of work between the ICM and SNIC to determine a portion of processing that is to be bypassed on the ICM for a first portion of inbound network traffic from the SNIC to the ICM, in part, because the division of work indicates that the portion of processing is performed on the SNIC for the first portion of inbound network traffic prior to arrival of the first portion of inbound network traffic at the ICM, wherein the first portion of inbound network traffic is generated at least in part by the function of switching and routing performed by the SNIC;
providing at least two data paths for network traffic flow through the ICM, the first data path of the at least two data paths associated with a virtual passthrough group, the virtual passthrough group associated with the first portion of inbound network traffic, the second data path of the at least two data paths associated with both a switching and routing group and a second portion of inbound network traffic; and
performing switching and routing processing for the second portion of inbound traffic associated with both the second data path and the switching and routing group, in part, because the portion of processing has not been performed for the second portion of inbound traffic prior to arrival at the ICM, wherein the second portion of inbound traffic is generated at least in part by the at least one function other than switching and routing performed by the SNIC.

12. The method of claim 11, further comprising:
obtaining second information pertaining to a second set of capabilities of a second network interface card (NIC) associated with a second device connected to a second port of the at least two ports of the ICM, the second device communicating on the first network of the set of interconnected networks;
determining from the obtained second information that the second set of capabilities lack capability to preprocess network traffic data prior to arrival at the ICM; and
associating the second NIC with the second data path.

13. The method of claim 12, further comprising:
receiving a plurality of network packets from the first device destined for the second device; and
providing an outbound network packet for each of the plurality of network packets to the second device from the ICM without performing switching and routing processing at the ICM.

14. The method of claim 13, further comprising:
providing the outbound network packet for each of the plurality of network packets to the second device without altering contents of each of the plurality of network packets as a result of processing of the ICM.

15. The method of claim 11, further comprising:
processing network packets in the first data path and the second data path concurrently.

16. The method of claim 15, wherein the first network of the set of interconnected networks is connected to the ICM supporting inter-device communication on the first network, the first network including:
at least one device having a standard NIC;
at least one device having an advanced NIC (ANIC); and
at least one device having a smart NIC (SNIC).

17. The method of claim 11, wherein concurrent processing performed by the ICM for a first set of network packets received from at least one device and a second set of network packets received from another device different than the at least one device includes:
processing the first set of network packets using switching and routing functionality; and processing the second set of network packets by allowing the second set of network packets to bypass switching and routing functionality of the ICM.

18. A non-transitory computer readable medium comprising instructions stored thereon that, when executed by a processor associated with an interconnect module (ICM) of a network infrastructure device, cause the ICM to:

obtain information pertaining to a first set of capabilities of a first network interface card (NIC) associated with a first device connected to a first port of at least two ports of the ICM, the first device communicating on a first network of a set of interconnected networks;

determine from the obtained information that the first NIC represents a smart NIC (SNIC), wherein the SNIC performs a function of switching and routing and performs at least one function other than switching and routing;

send information pertaining to capabilities of the ICM to the first NIC;

classify the first NIC in a group that allows the ICM to offload the capabilities of the ICM to the first NIC;

based on the classification, send outbound network traffic without processing from the ICM to the first NIC for switching and routing;

identify a division of work between the ICM and SNIC to determine a portion of processing that is to be bypassed on the ICM for a first portion of inbound network traffic from the SNIC to the ICM, in part, because the division of work indicates that the portion of processing is performed on the SNIC for the first portion of inbound network traffic prior to arrival of the first portion of inbound network traffic at the ICM, wherein the first portion of inbound network traffic is generated at least in part by the function of switching and routing performed by the SNIC;

provide at least two data paths for network traffic flow through the ICM, the first data path of the at least two data paths associated with a virtual passthrough group, the virtual passthrough group associated with the first portion of inbound network traffic, the second data path of the at least two data paths associated with both a switching and routing group and a second portion of inbound network traffic; and perform switching and routing processing for the second portion of inbound traffic associated with both the second data path and the switching and routing group, in part, because the portion of processing has not been performed for the second portion of inbound traffic prior to arrival at the ICM, wherein the second portion of inbound traffic is generated at least in part by the at least one function other than switching and routing performed by the SNIC.

19. The non-transitory computer readable medium of claim 18, further comprising instructions to cause the ICM to:

receive a network packet from the first device; and provide the network packet as outbound network traffic without altering contents of the network packet.

20. The non-transitory computer readable medium of claim 19, wherein the instructions to obtain information pertaining to the first set of capabilities of the first network interface card (NIC) associated with the first device connected to the first port of the at least two ports of the ICM comprise instructions to negotiate between the ICM and the first device to determine processing to be performed for traffic from the first device prior to arrival at the ICM.

* * * * *